(12) United States Patent
Fauler et al.

(10) Patent No.: US 10,468,715 B2
(45) Date of Patent: Nov. 5, 2019

(54) COMPOSITE MATERIAL, ELECTRODE, METHOD OF PRODUCING THE MATERIAL AND THE ELECTRODE AND ELECTROCHEMICAL CELL

(71) Applicant: VARTA Microbattery GmbH, Ellwangen Jagst (DE)

(72) Inventors: Gisela Fauler, Graz (AT); Harald Kren, Graz (AT); Martin Schmuck, Graz (AT)

(73) Assignee: VARTA Microbattery GmbH, Ellwangen Jagst (DE)

( * ) Notice: Subject to any disclaimer, the term of this patent is extended or adjusted under 35 U.S.C. 154(b) by 0 days.

(21) Appl. No.: 15/766,540

(22) PCT Filed: Sep. 26, 2016

(86) PCT No.: PCT/EP2016/072866
§ 371 (c)(1),
(2) Date: Apr. 6, 2018

(87) PCT Pub. No.: WO2017/060115
PCT Pub. Date: Apr. 13, 2017

(65) Prior Publication Data
US 2018/0287192 A1    Oct. 4, 2018

(30) Foreign Application Priority Data
Oct. 7, 2015 (EP) .................................. 15188846

(51) Int. Cl.
*H01B 1/12* (2006.01)
*H01M 4/00* (2006.01)
(Continued)

(52) U.S. Cl.
CPC .......... *H01M 10/0525* (2013.01); *H01B 1/12* (2013.01); *H01G 11/06* (2013.01);
(Continued)

(58) Field of Classification Search
CPC .... H01M 10/0525; H01M 2/14; H01M 4/364; H01M 4/505; H01M 4/583; H01M 4/606;
(Continued)

(56) References Cited

U.S. PATENT DOCUMENTS 6,514,431 B1 * 2/2003 Nishikitani ........... G02F 1/1525
252/500

FOREIGN PATENT DOCUMENTS

| CN | 102903525 A | 1/2013 |
| CN | 103159952 A | 6/2013 |

(Continued)

OTHER PUBLICATIONS

Liou et al. "Highly Stable Anodic Electrochromic Aromatic Polyamide Containing N,N,N',N'-Tetraphenyl-p Phenylenediamine Moieties: Synthesis, Electrochemical, and Electrochromic Properties". American Chemical Society. Published on Web Feb. 9, 2008. Macromolecules 2008, 41, 1667-1674. Total Pages 8. (Year: 2008).*

(Continued)

*Primary Examiner* — Mark Kopec
(74) *Attorney, Agent, or Firm* — DLA Piper LLP (US)

(57) ABSTRACT

A composite material includes an electrochemically active organic material and an electrochemically active inorganic material. The organic material contains subunits according to formulae (I) and/or (II)

(Continued)

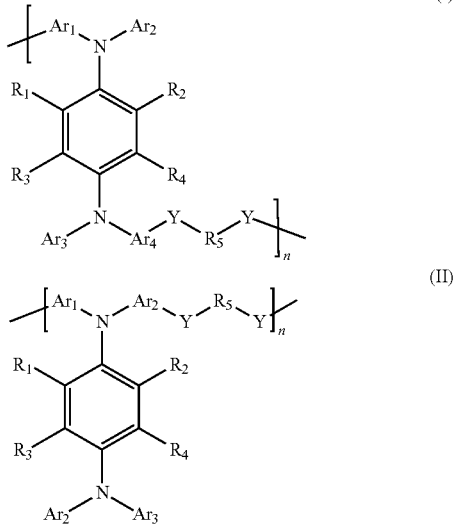

wherein n is an integer not smaller than 2, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl (preferably —$CH_3$, —$C_2H_5$), alkoxy-(preferably —$OCH_3$, —$OC_2H_5$), -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group.

18 Claims, 3 Drawing Sheets

(51) Int. Cl.
| | |
|---|---|
| *H01M 10/00* | (2006.01) |
| *H01M 10/0525* | (2010.01) |
| *H01G 11/06* | (2013.01) |
| *H01M 4/36* | (2006.01) |
| *H01M 4/505* | (2010.01) |
| *H01G 11/38* | (2013.01) |
| *H01G 11/48* | (2013.01) |
| *H01G 11/50* | (2013.01) |
| *H01G 11/36* | (2013.01) |
| *H01M 2/14* | (2006.01) |
| *H01M 4/583* | (2010.01) |
| *H01M 4/62* | (2006.01) |
| *H01M 4/02* | (2006.01) |

(52) U.S. Cl.
CPC ............. *H01G 11/36* (2013.01); *H01G 11/38* (2013.01); *H01G 11/48* (2013.01); *H01G 11/50* (2013.01); *H01M 2/14* (2013.01); *H01M 4/364* (2013.01); *H01M 4/505* (2013.01); *H01M 4/583* (2013.01); *H01M 4/623* (2013.01); *H01M 2004/027* (2013.01); *H01M 2004/028* (2013.01)

(58) Field of Classification Search
CPC .. H01M 4/623; H01M 4/5825; H01M 10/052; H01M 2004/027; H01M 2004/028; C08G 73/028; H01G 11/06; H01G 11/36; H01G 11/38; H01G 11/48; H01G 11/50; Y02E 60/13; H01B 1/12; H01B 1/121
USPC ......................................................... 252/500
See application file for complete search history.

(56) References Cited

FOREIGN PATENT DOCUMENTS

| | | |
|---|---|---|
| EP | 2 025 689 A1 | 2/2009 |
| EP | 3 032 621 A1 | 6/2016 |

OTHER PUBLICATIONS

Guey-Sheng Liou et al., "Electrochemical behavior of N,N,N';N'-tetraphenyl-1,4-phenylenediamine moiety on novel aromatic polyamides and their electrochromic properties," Dyes and Pigments, vol. 74, 2007, pp. 273-278.

Guey-Sheng Liou et al., "Highly Stable Anodic Electrochromic Aromatic Plyamides Containing N,N,N',N'-Tetraphenyl-p-Phenylenediamine Moieties: Synthesis, Electrochemical, and Electrochomic Properties," Macromolecules, vol. 41, 2008, pp. 1667-1674.

Sean Conte et al., "Designing conducting polymer films for electrochemical energy storage technologies," RSC Advances, 2013, 3, pp. 1957-1964 (Abstract only).

Chang Su et al., "Polytriphenylamine derivative with high free radical density as the novel organic cathode for lithium ion batteries," Journal of Materials Chemistry A, 2014,2, pp. 20083-20088 (Abstract only).

* cited by examiner

COMPOSITE MATERIAL, ELECTRODE, METHOD OF PRODUCING THE MATERIAL AND THE ELECTRODE AND ELECTROCHEMICAL CELL

TECHNICAL FIELD

This disclosure relates to a composite material, an electrode comprising the material, a method of producing the material and the electrode and an electrochemical cell comprising the electrode.

BACKGROUND

The term "battery" originally meant a plurality of electrochemical cells connected in series in a housing. However, even single electrochemical cells are nowadays frequently referred to as a battery. During discharge of an electrochemical cell, an energy-supplying chemical reaction made up of two electrically coupled but spatially separated part reactions takes place. A part reaction takes place at a relatively low redox potential at the negative electrode and a part reaction takes place at a relatively high redox potential at the positive electrode. During discharge, electrons are liberated by an oxidation process at the negative electrode, resulting in an electron current flowing via an external load to the positive electrode which takes up a corresponding quantity of electrons. Thus, a reduction process takes place at the positive electrode. At the same time, an ion current corresponding to the electrode reaction flows within the cell. This ion current is ensured by an ionically conductive electrolyte. In secondary cells and batteries, this discharging reaction is reversible, i.e., it is possible to reverse the transformation of chemical energy into electric energy that occurred during discharge. Where the terms "anode" and "cathode" are used in this context, the electrodes are generally named according to their function during discharging. The negative electrode in such cells is thus the anode, and the positive electrode is the cathode.

Each electrode comprises at least one electrode active material and electrochemically inactive components. An electrode active material experiences a chemical transformation during charging and discharging, in particular an oxidation or reduction (the above-mentioned oxidation and reduction processes). In contrast, electrochemically inactive components are essentially unaffected during charging and discharging. Examples of electrochemically inactive components of an electrode are electrode binders, current collectors, power outlet leads and conductivity-improving additives. Electrons are supplied to or conducted away from the electrodes by power outlet leads. Electrode binders ensure the mechanical stability of the electrodes and contacting of the particles of electrochemically active material with one another and with the power outlet lead. Conductivity-improving additives contribute to an improved electric connection between the electrochemically active particles and the power outlet lead.

Lithium-ion batteries are the most frequently used secondary batteries for portable electronic devices. The mechanism for charge storage is based on the intercalation/deintercalation of Li-ions in usually metal oxides (electrode active material on the cathode side) and carbon (electrode active material on the anode side). Lithium-ion batteries exhibit good energy density and cycle stability, but moderate capacities or capacity retention at higher current densities because of the slow rates of the electrode reactions, resulting in low power densities.

In contrast, double-layer capacitors (supercapacitors) can provide high pulsed currents at high power densities. However, the capacity of double-layer capacitors is limited according to the nature of a capacitor. Furthermore, like all capacitors, double-layer capacitors have a falling voltage characteristic.

Battery cells utilizing organic compounds as electrode active materials are capable of producing higher power densities and also higher gravimetric energy densities than Lithium-ion batteries. One example is the utilization of reversible oxidation/reduction—reactions of compounds containing stable radicals such as nitroxide radicals. For example, EP 2 025 689 A1 discloses the use of nitroxide radical containing polymers as electrode active materials in secondary batteries that have very good capacity retention at higher current rates (high power density) and cyclic stability.

However, many organic electrode materials, like, e.g., conducting polymers or also some polyradicals, start to degrade when cycled to and held at higher potentials, for example, at potentials close to or above 4 V vs. Li/Li+.

Compounds containing N,N,N',N'-tetrasubstituted-1,4-phenylenediamine units are utilized in optoelectronic devices such as organic light emitting devices (OLED) or electrochromic devices. The use as electrochromic material has been described, for example, in Liou, G.; Chang, C. Macromolecules 2008, 41, 1667-1674. Preparation of polyamides containing N,N,N',N'-tetraphenyl-1,4-phenylenediamine units is described. As another example, U.S. Pat. No. 8,304,514 A discloses a polyfluorene compound containing N,N,N',N'-tetraphenyl-p-phenylenediamine units and its utilization as electrochromic material.

The use of poly(3,4-ethylenedioxythiophene) containing N,N,N',N'-tetraalkylated-1,4-phenylene-diamine units as electrical energy storage material has been described in Conte, S.; Rodríguez-Calero, G. G.; Burkhardt, S. E.; Lowe, M. A.; Abruña, H. D. RSC Advances 2013, 3, 1957-1964. The use of a polymer containing N,N,N',N'-tetraphenyl-1,4-phenylenediamine units as cathode material for lithium ion batteries has been described in Chang Su; Fang Yang; LvLv Ji; Lihuan Xu; Cheng Zhang, J. Mater. Chem. A 2014, 2, 20083-20088.

There is, therefore. an ongoing need for an electrode material for lithium-ion batteries and/or double-layer capacitors having good capacity retention at high current densities and/or high power densities.

SUMMARY

We provide a composite material capable of storing electric energy including an electrochemically active inorganic particulate material, and an electrochemically active organic material, wherein the organic material contains or is composed of subunits according to formulae (I) and/or (II),

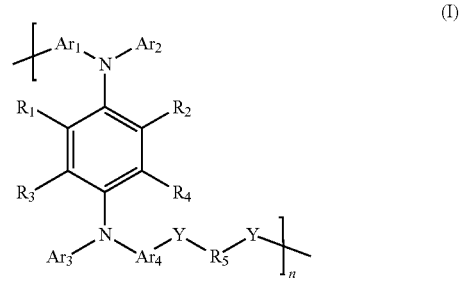

-continued

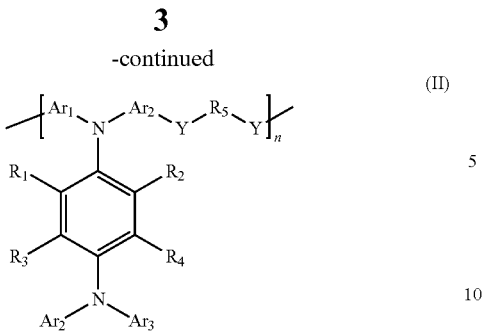
(II)

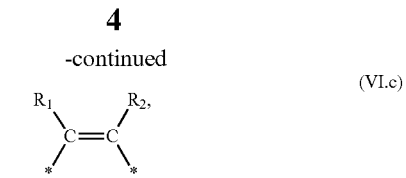
(VI.c)

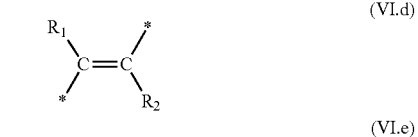
(VI.d)

wherein, in these formulae (I) and (II): n is an integer ≥2, preferably ≥20, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl, alkoxy-, -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group, wherein $Ar_1$ and $Ar_4$ in formulae (I) and (II) independently represent a bridging aryl group of formulae (III.a), (III.b) or (III.c)

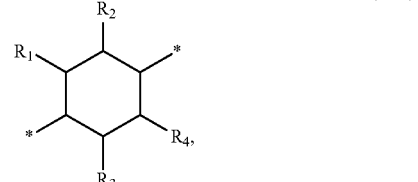
(VI.e)

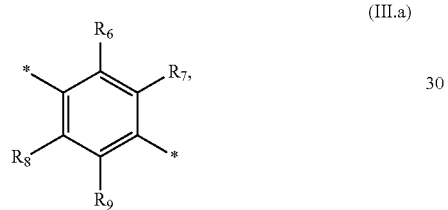
(III.a)

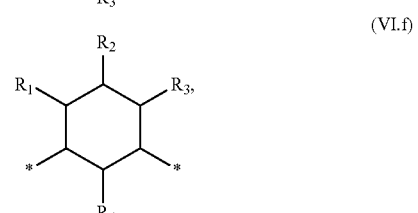
(VI.f)

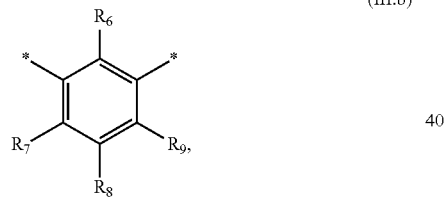
(III.b)

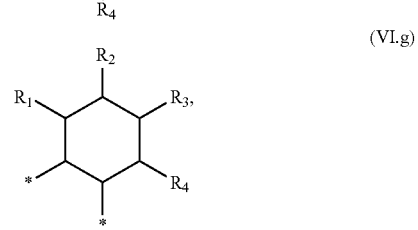
(VI.g)

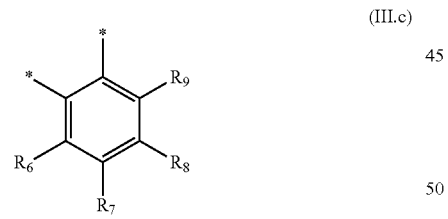
(III.c)

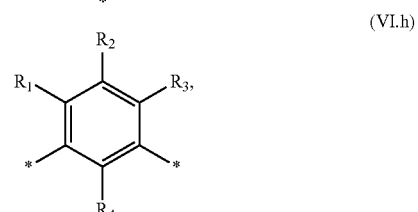
(VI.h)

wherein in these formulae (III.a) to (III.c) * indicates a point of attachment, $R_6$, $R_7$, $R_8$ and $R_9$ each independently represent H, alkyl, alkoxy-, -halogen or —CN, and wherein $R_5$ represents one of the groups of formulae (VI.a) to (VI.q)

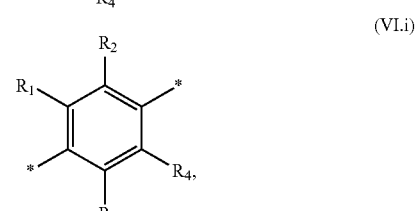
(VI.i)

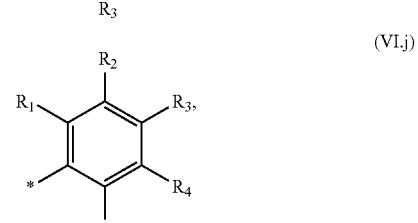
(VI.j)

*—(CH$_2$)$_m$—*,
(VI.a)

(VI.b)

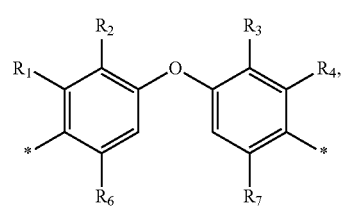
(VI.k)

-continued

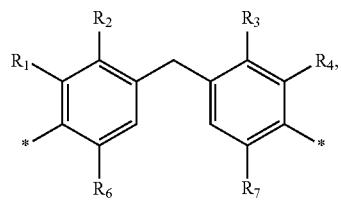
(VI.l)

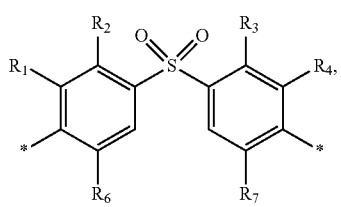
(VI.m)

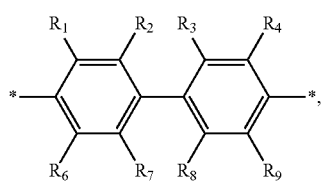
(VI.n)

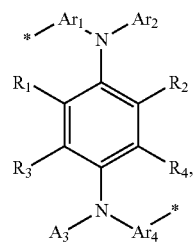
(VI.o)

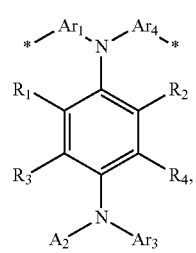
(VI.p)

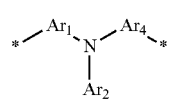
(VI.q)

wherein * indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ are defined as above.

We also provide a method of producing the composite material capable of storing electric energy including an electrochemically active inorganic particulate material, and an electrochemically active organic material, wherein the organic material contains or is composed of subunits according to formulae (I) and/or (II),

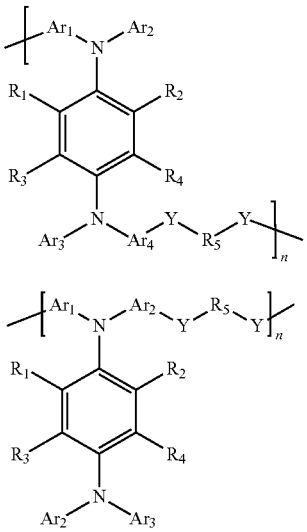
(I)

(II)

wherein, in these formulae (I) and (II): n is an integer ≥2, preferably ≥20, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl, alkoxy-, -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group, wherein $Ar_1$ and $Ar_4$ in formulae (I) and (II) independently represent a bridging aryl group of formulae (III.a), (III.b) or (III.c)

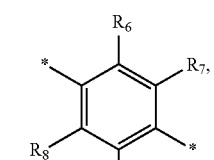
(III.a)

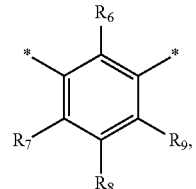
(III.b)

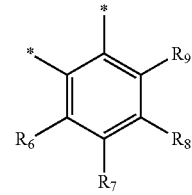
(III.c)

wherein in these formulae (III.a) to (III.c) * indicates a point of attachment, $R_6$, $R_7$, $R_8$ and $R_9$ each independently represent H, alkyl, alkoxy-, -halogen or —CN, and wherein $R_5$ represents one of the groups of formulae (VI.a) to (VI.q)

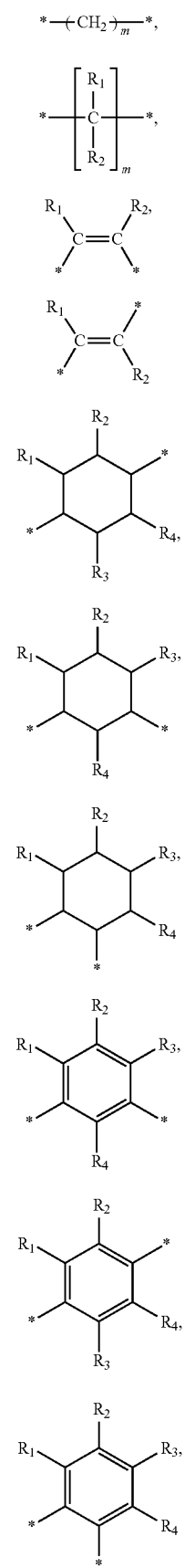
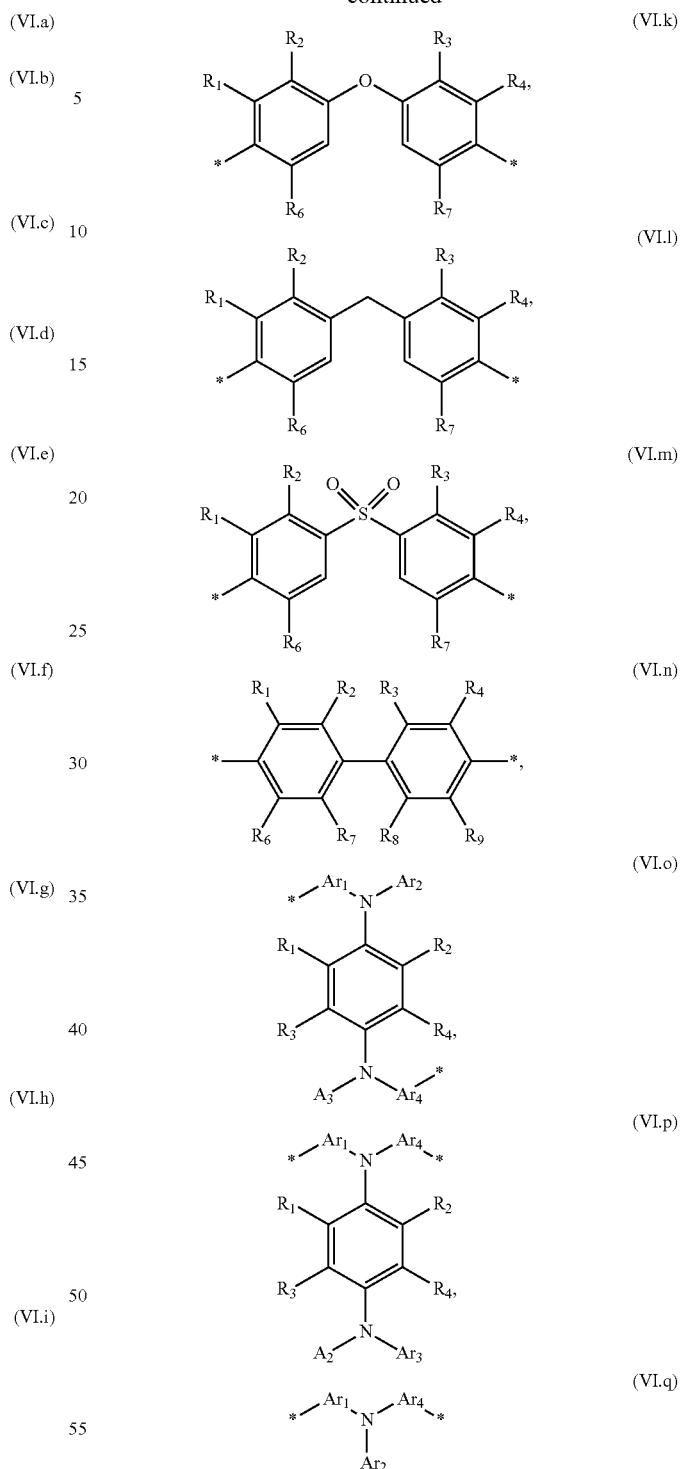

wherein * indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ are defined as above, wherein the organic material is produced by polymerization in an organic solvent, the inorganic particulate material and, optionally, the at least one conditioner with regard to electric conductivity and/or the at least one conditioner with regard to ionic conductivity and/or the at least one binder polymer is added into the solvent containing the polymer, thereby forming a slurry.

We further provide an electrode including the composite material capable of storing electric energy including an electrochemically active inorganic particulate material, and an electrochemically active organic material, wherein the organic material contains or is composed of subunits according to formulae (I) and/or (II),

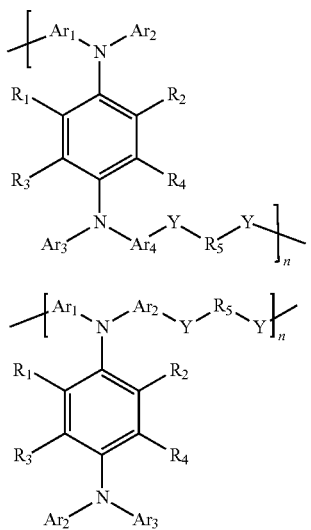

wherein, in these formulae (I) and (II): n is an integer ≥2, preferably ≥20, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl, alkoxy-, -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group, wherein $Ar_1$ and $Ar_4$ in formulae (I) and (II) independently represent a bridging aryl group of formulae (III.a), (III.b) or (III.c)

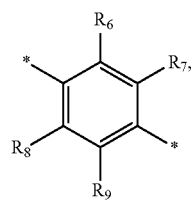

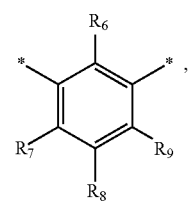

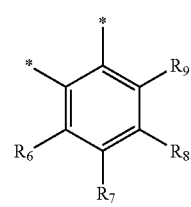

wherein in these formulae (III.a) to (III.c) * indicates a point of attachment, $R_6$, $R_7$, $R_8$ and $R_9$ each independently represent H, alkyl, alkoxy-, -halogen or —CN, and wherein $R_5$ represents one of the groups of formulae (VI.a) to (VI.q)

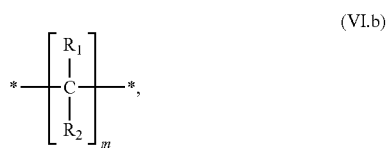

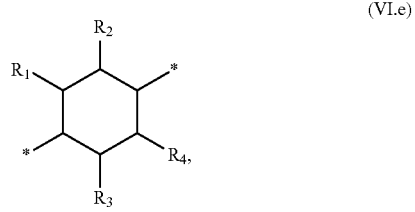

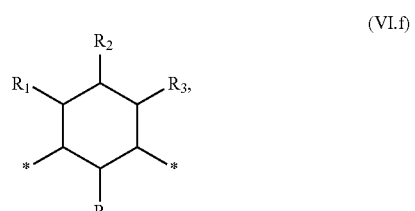

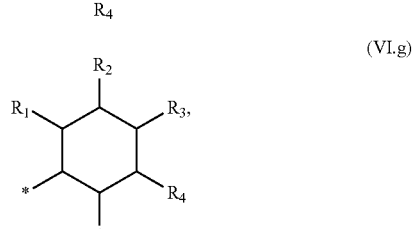

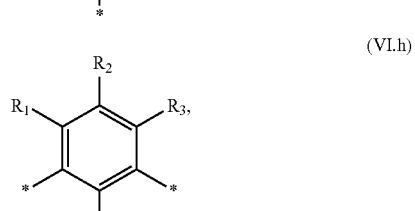

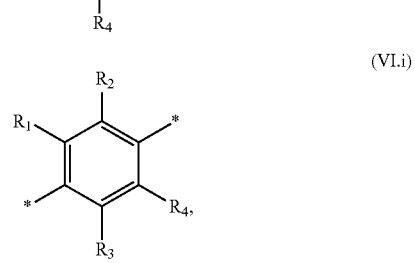

-continued

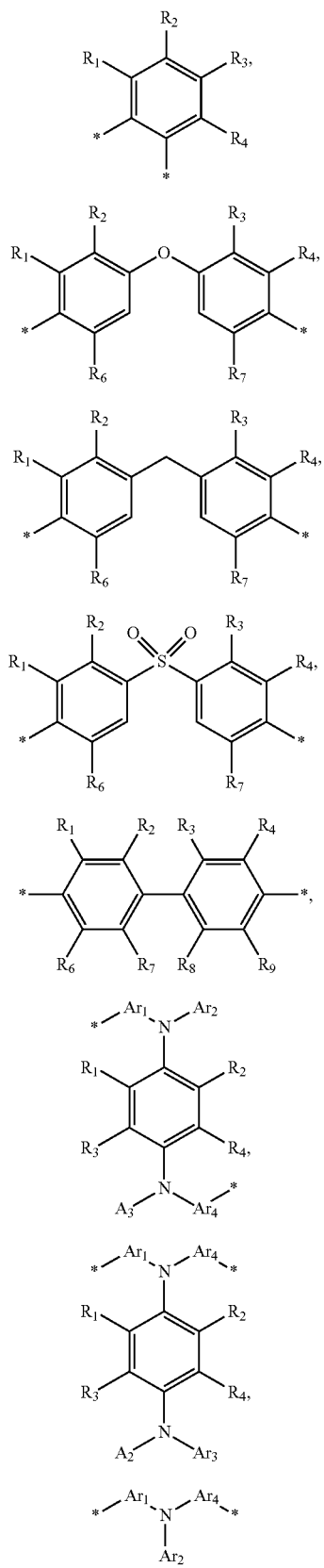

defined as above and, optionally, a polymer binder soluble either in an organic solvent or water.

We also further provide an electrochemical cell including a positive and a negative electrode, a composite material capable of storing electric energy including an electrochemically active inorganic particulate material, and an electrochemically active organic material, wherein the organic material contains or is composed of subunits according to formulae (I) and/or (II),

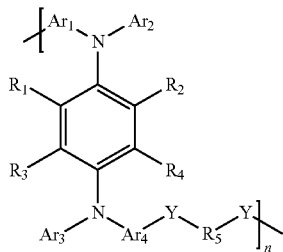 (I)

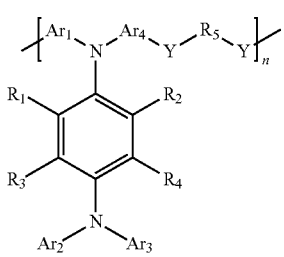 (II)

wherein, in these formulae (I) and (II): n is an integer $\geq 2$, preferably $\geq 20$, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl, alkoxy-, -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group, wherein $Ar_1$ and $Ar_4$ in formulae (I) and (II) independently represent a bridging aryl group of formulae (III.a), (III.b) or (III.c)

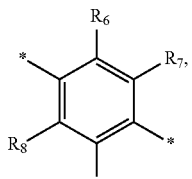 (III.a)

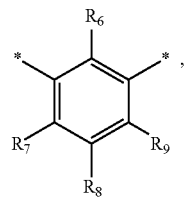 (III.b)

wherein * indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ are (III.c)
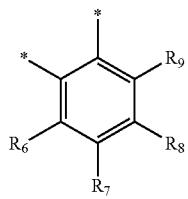
wherein in these formulae (III.a) to (III.c) * indicates a point of attachment, $R_6$, $R_7$, $R_8$ and $R_9$ each independently represent H, alkyl, alkoxy-, -halogen or —CN, and wherein $R_5$ represents one of the groups of formulae (VI.a) to (VI.q)
(VI.a)
$*\!\!-\!\!(CH_2)_m\!\!-\!\!*$,
(VI.b)
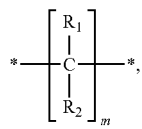
(VI.c)
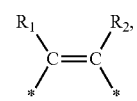
(VI.d)
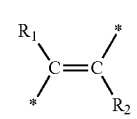
(VI.e)
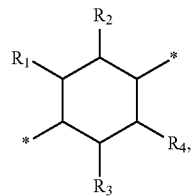
(VI.f)
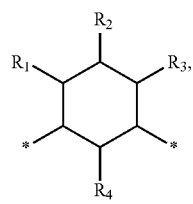
(VI.g)
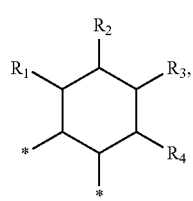
(VI.h)
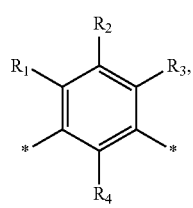
(VI.i)
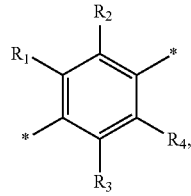
(VI.j)
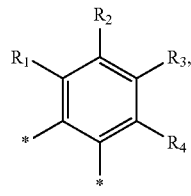
(VI.k)
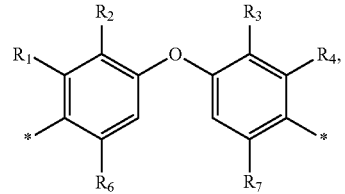
(VI.l)
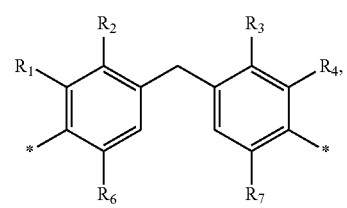
(VI.m)
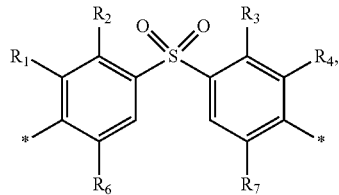
(VI.n)
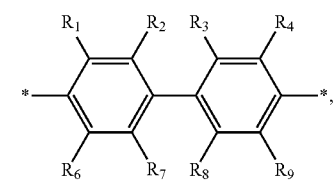
(VI.o)
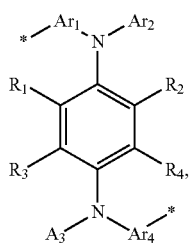

-continued (VI.p)

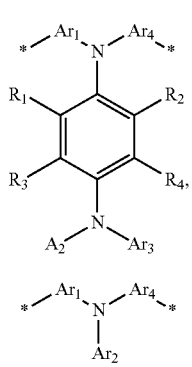

(VI.q)

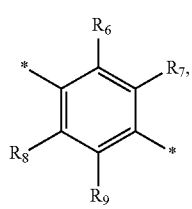

wherein * indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ are defined as above or the electrode including the composite material capable of storing electric energy including an electrochemically active inorganic particulate material, and an electrochemically active organic material, wherein the organic material contains or is composed of subunits according to formulae (I) and/or (II), (I)

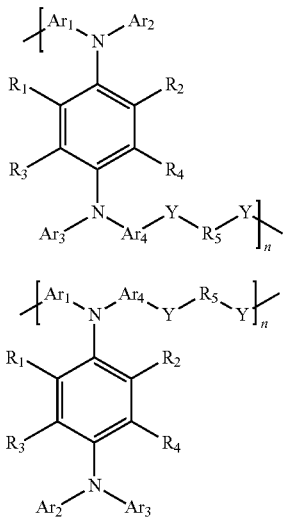

(II)

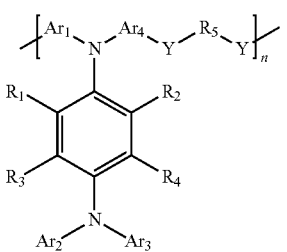

wherein, in these formulae (I) and (II): n is an integer ≥2, preferably ≥20, Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl, alkoxy-, -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group, wherein $Ar_1$ and $Ar_4$ in formulae (I) and (II) independently represent a bridging aryl group of formulae (III.a), (III.b) or (III.c)

(III.a)

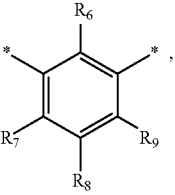

(III.b)

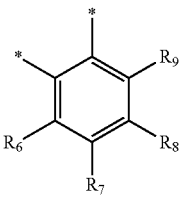

(III.c)

wherein in these formulae (III.a) to (III.c) * indicates a point of attachment, $R_6$, $R_7$, $R_8$ and $R_9$ each independently represent H, alkyl, alkoxy-, -halogen or —CN, and wherein $R_5$ represents one of the groups of formulae (VI.a) to (VI.q)

(VI.a)

$$*\!-\!(\mathrm{CH_2})_m\!-\!*,$$

(VI.b)

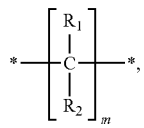

(VI.c)

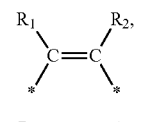

(VI.d)

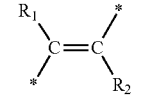

(VI.e)

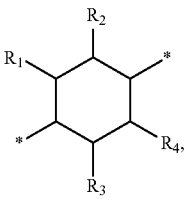

(VI.f)

(VI.g)

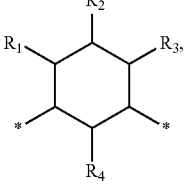

(VI.h) 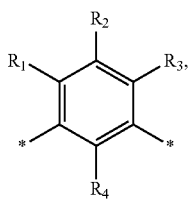

(VI.i) 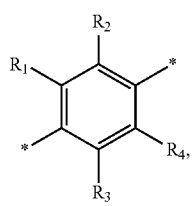

(VI.j) 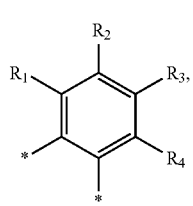

(VI.k) 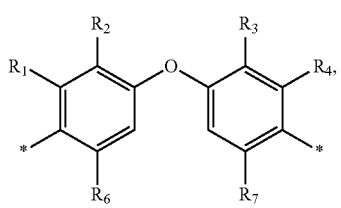

(VI.l) 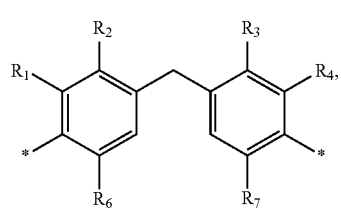

(VI.m) 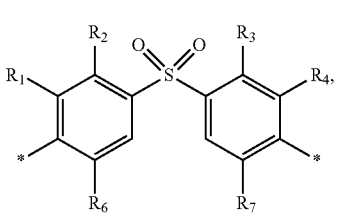

(VI.n) 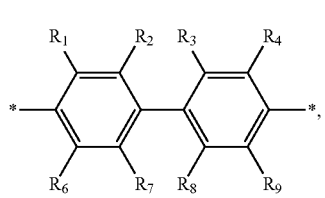

(VI.o) 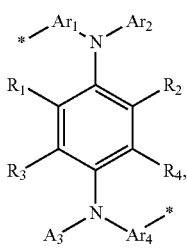

(VI.p) 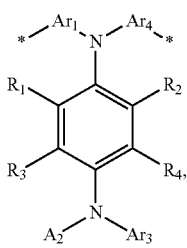

(VI.q) 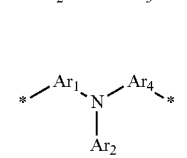

wherein * indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ are defined as above, as part of the positive electrode or as the positive electrode.

DETAILED DESCRIPTION

Figure 1:
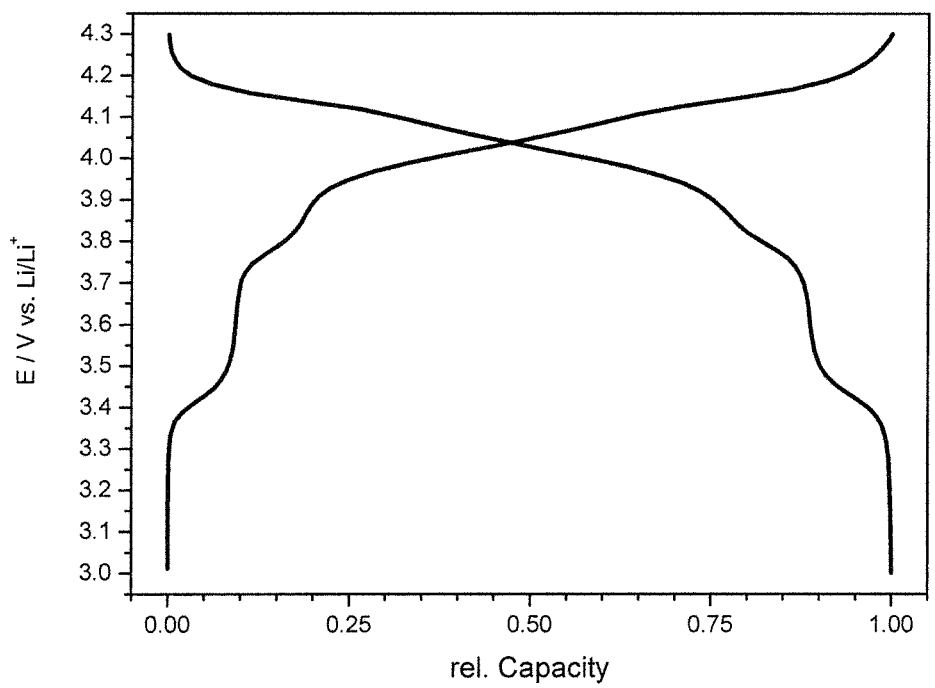
FIGS. 1 to 6 are graphs showing relative capacity versus EAT vs. Li/Li* taken from Examples 1-6, respectively.

We provide a composite material capable of storing electric energy, comprising a. an electrochemically active inorganic particulate material, and b. an electrochemically active organic material, wherein the electrochemically active organic material contains or is composed of subunits according to general formulae (I) and/or (II):

(I) 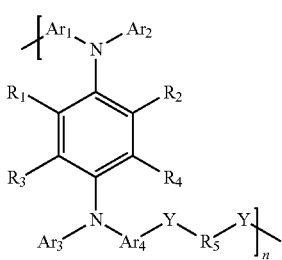

-continued

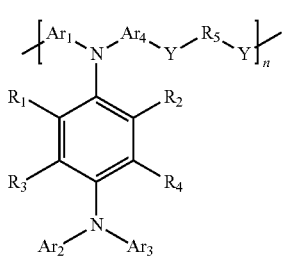
(II)

In formulae (I) and (II):

n is an integer ≥2, preferably ≥20,

Y represents an amide group (—NH—CO— or —CO—NH—), an ester group (—O—CO— or —CO—O—) or a urethane group (—NH—CO—O— or —O—CO—NH—), $R_1$, $R_2$, $R_3$ and $R_4$ each independently represent H, alkyl (preferably —$CH_3$, —$C_2H_5$), Alkoxy-(preferably —$OCH_3$, —$OC_2H_5$), -halogen or —CN, $Ar_1$ and $Ar_4$ independently represent a bridging aryl group, $Ar_2$ and $Ar_3$ independently represent a non-bridging aryl group, and $R_5$ is a bridging alkyl, alkene or aryl group.

Of particular importance are the bridging groups $Ar_1$, $Ar_4$ and $R_5$. $Ar_1$ and $Ar_4$ in formulae (I) and (II) independently represent a bridging aryl group of formula (III.a), (III.b) or (III.c)

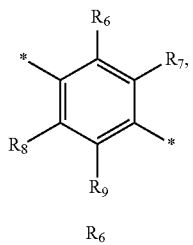
(III.a)

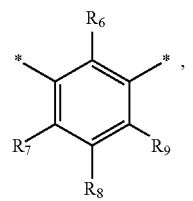
(III.b)

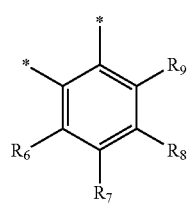
(III.c)

In formulae (III.a) to (III.c):

* indicates a point of attachment $R_6$, $R_7$, $R_8$ and $R_9$ each independently represent H, alkyl (preferably —$CH_3$, —$C_2H_5$), Alkoxy-(preferably —$OCH_3$, —$OC_2H_5$), -halogen or —CN $R_5$ represents one of the groups of formulae (VI.a) to (VI.q)

$$*\!\!-\!\!(CH_2)_{\overline{m}}\!\!-\!\!*,$$
(VI.a)

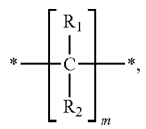
(VI.b)

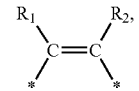
(VI.c)

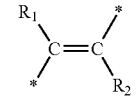
(VI.d)

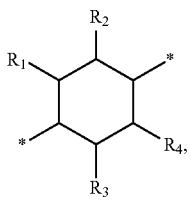
(VI.e)

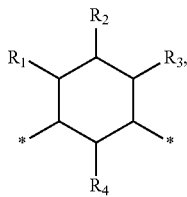
(VI.f)

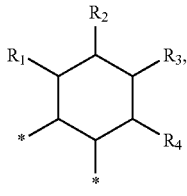
(VI.g)

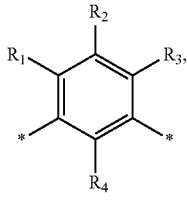
(VI.h)

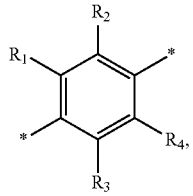
(VI.i)

-continued (VI.j)
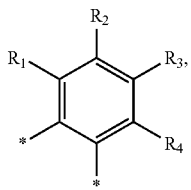

(VI.k)
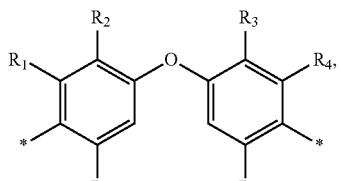

(VI.l)
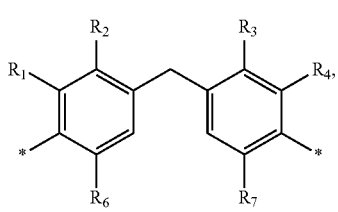

(VI.m)
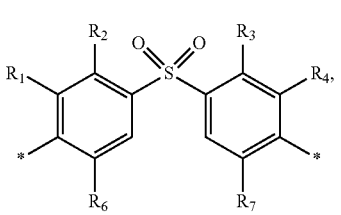

(VI.n)
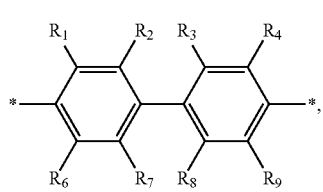

(VI.o)
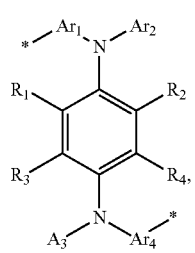

(VI.p)
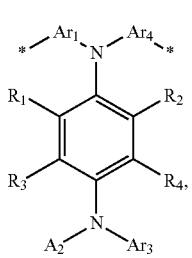

-continued (VI.q)
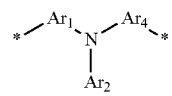

wherein

\* indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ have the same meaning as before.

Thus, the polymeric material is either a polyamide or a polyester or a polyurethane.

Preferably, $Ar_2$ and $Ar_3$ in formulae (I) and (II) independently represent a non-bridging aryl group of formula (III)

(IV)
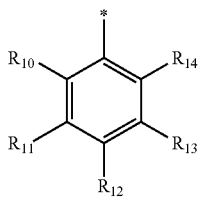

wherein $R_{10}$, $R_{11}$, $R_{12}$, $R_{13}$ and $R_{14}$ each independently represent H, alkyl (preferably —$CH_3$, —$C_2H_5$), Alkoxy-(preferably —$OCH_3$, —$OC_2H_5$), halogen, CN or one of the groups of formulae (V.a) and (V.b)

(V.a)
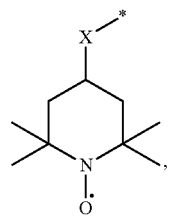

(V.b)
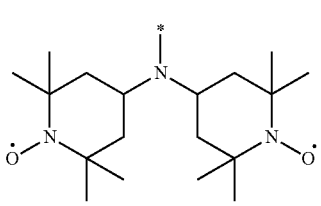

wherein

\* indicates a point of attachment, and

X represents O or NH.

In electrochemical cells with an organic electrolyte which contain polymers represented by formulae (I) and (II) as electrode active material, the mechanism of energy storage is the reversible oxidation/reduction of the N,N,N',N'-tetraphenyl-1,4-phenylenediamine unit according to Scheme 1:

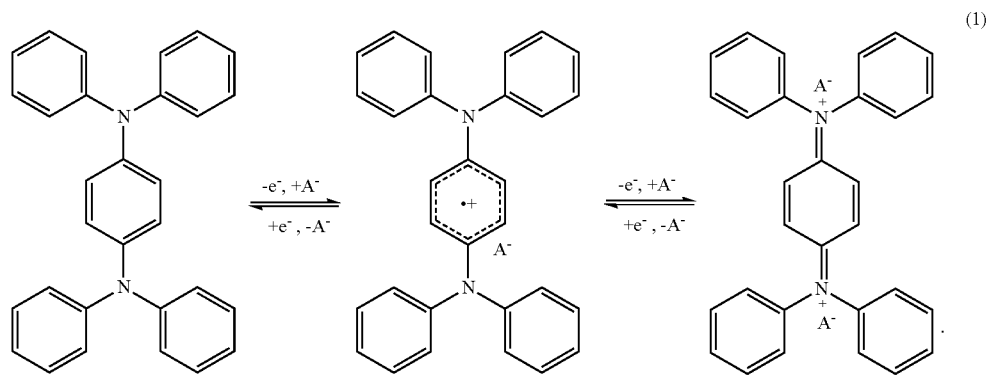

(1)

In Scheme (1), $A^-$ is the anion derived from the electrolyte salt and may be, for example, the anion derived from $LiPF_6$, $LiClO_4$, $LiBF_4$, $LiN(SO_2CF_3)$ or $NaCl$.

The polymer compound may also carry stable nitroxide radicals. The underlying mechanism of energy storage is the reversible oxidation/reduction of the nitroxide radical according to Scheme 2 representatively showing the redox couples of 2,2,6,6-tetramethylpiperidine-1-oxyl (TEMPO):

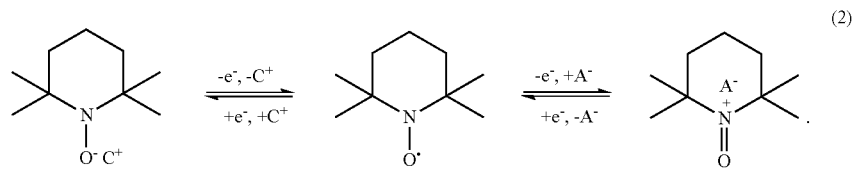

(2)

In Scheme (2), $A^-$ has the same meaning as before and $C^+$ is the cation derived from the electrolyte salt and may be, for example, $Li^+$ or $Na^+$.

POLYMER EXAMPLES

Not limiting examples of individual compounds, which have a structure represented by formulae (I) and (II), are represented by formulae 1-16. The theoretical specific capacity (Ah/kg) is shown for each of the compounds and has been calculated using Equation 1.

Theoretical specific capacity=$F/[3.6\times(M/z)]$ (eq.1)

$F$=Faraday constant=96485 C/mol
$M$=molecular weight of the repeating unit
$z$=electrons transferred per repeating unit

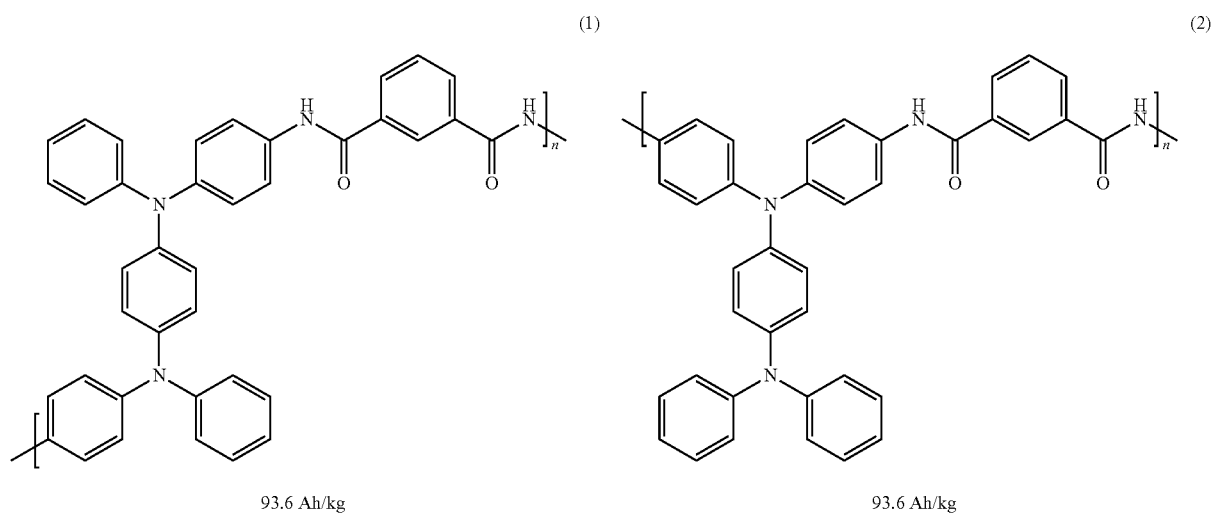

(1)   93.6 Ah/kg            (2)   93.6 Ah/kg

-continued
(3)
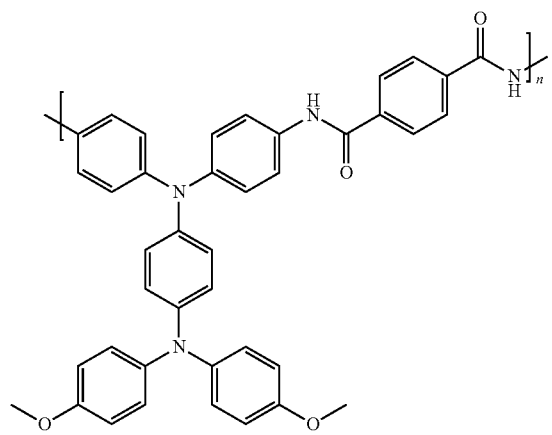
84.7 Ah/kg
(4)
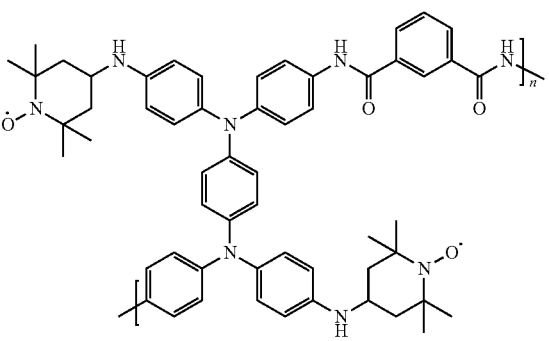
117.7 Ah/kg
(5)
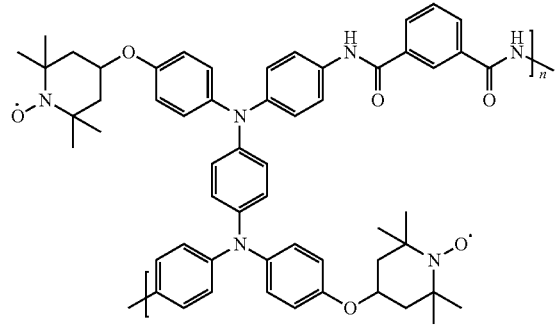
117.4 Ah/kg
(6)
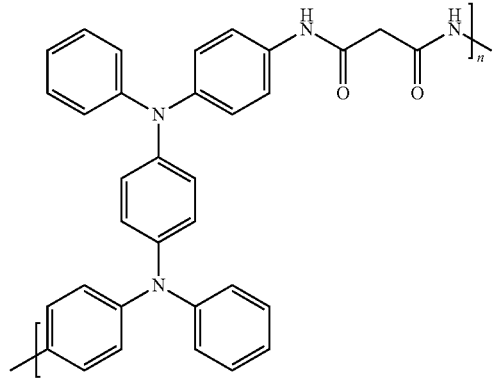
105 Ah/kg)
(7)
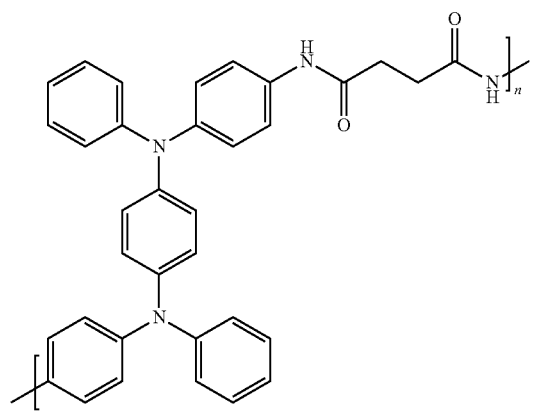
102.2 Ah/kg
(8)
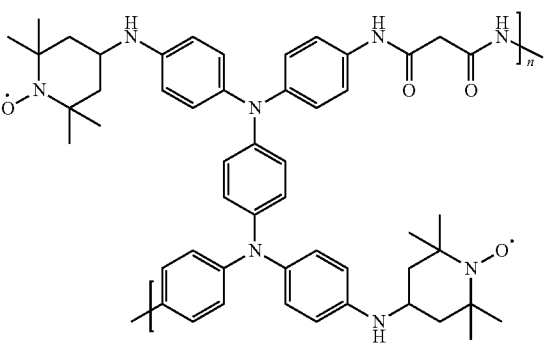
126.3 Ah/kg -continued
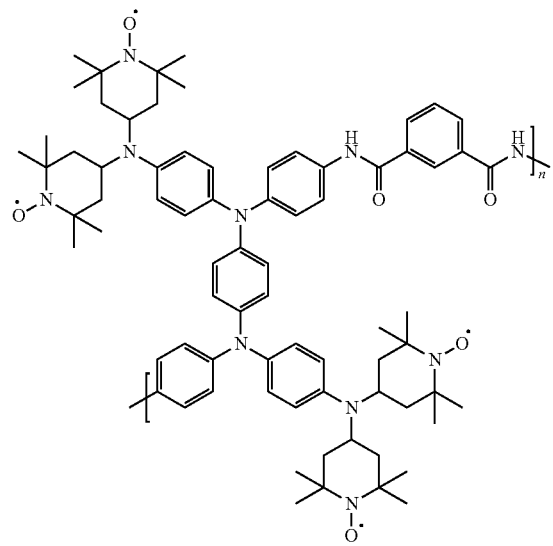
(9)
131.9 Ah/kg
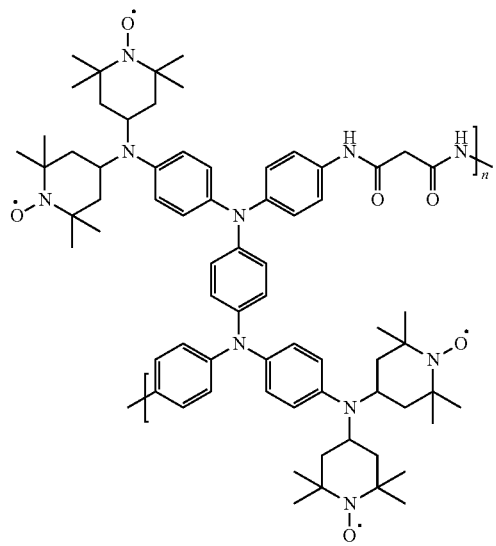
(10)
138.9 Ah/kg
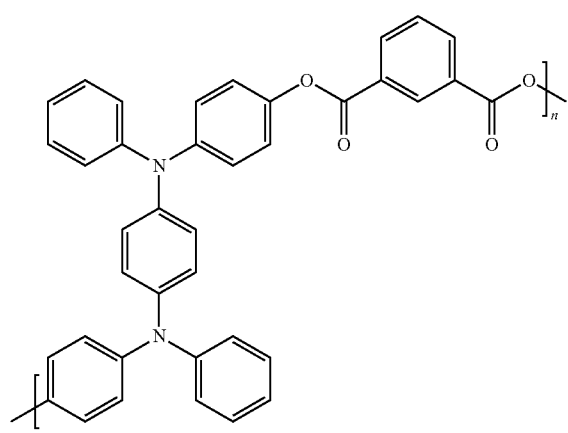
(11)
93.3 Ah/kg
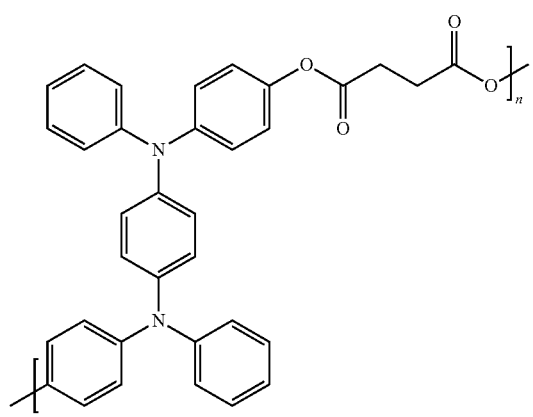
(12)
101.8 Ah/kg -continued
(13)
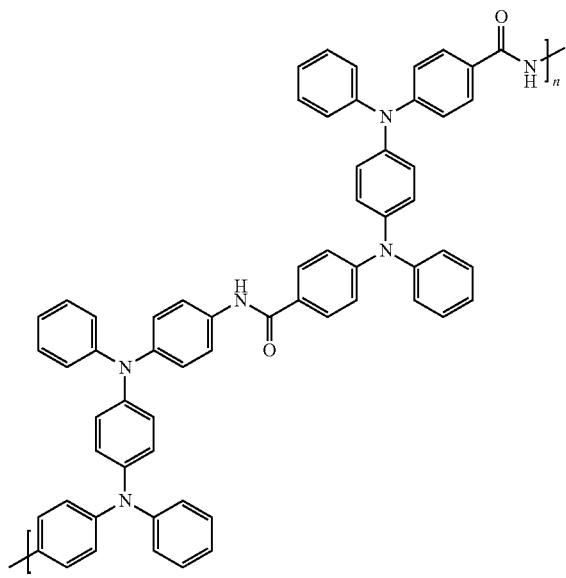
118.2 Ah/kg
(14)
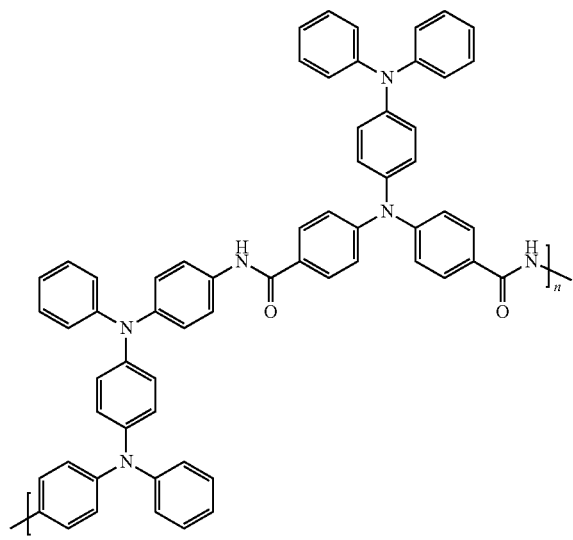
118.2 Ah/kg
(15)
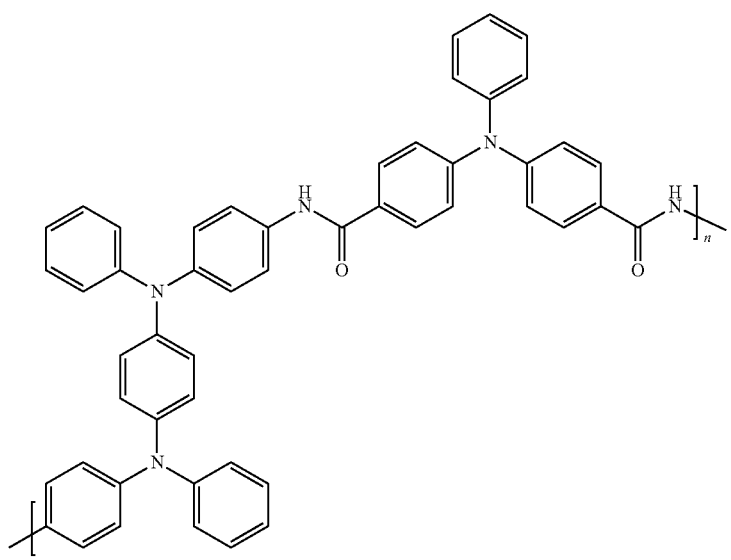
108.7 Ah/g

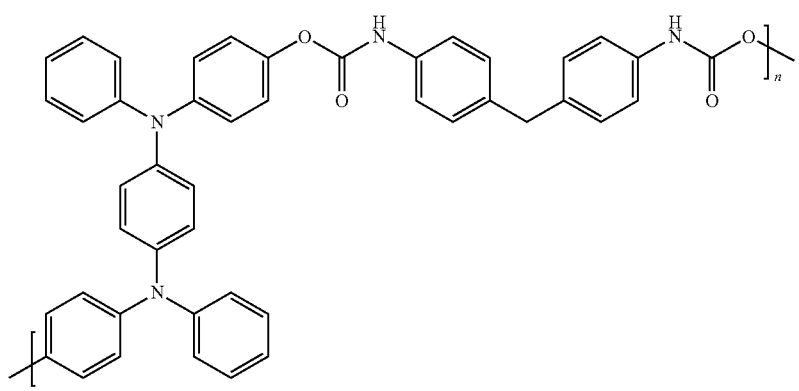

(16)

77.1 Ah/kg

The organic material preferably has a dynamic viscosity from 2.5 mPas to 50 mPas (measured in NMP at 20° C. and a concentration of 2 wt. %).

Preferably, the organic material has an average molecular weight of 200.000 g/mol to 400.000 g/mol.

The electrochemically active inorganic particulate material is capable of storing electrical energy by the electrical double layer effect and/or by a chemical transformation.

It is preferred that the inorganic particulate material comprises or consists of particles of a carbon material, a metal oxide, or a mixture comprising these particles or consisting of these particles.

The carbon material is preferably selected from the group consisting of activated carbon, carbon nanotubes, graphene, graphene oxide and graphene derivatives.

The metal oxide is preferably selected from the group consisting of $LiMnPO_4$, $LiCoPO_4$, $LiFePO_4$, $LiNiPO_4$, $LiMn_2O_4$, $LiAl_2O_4$, $LiCo_2O_4$, $LiNi_2O_4$, $LiNiO_2$, $Li_4Ti_5O_{12}$, $LiCoO_2$, $LiNi_{0.5}Mn_{1.5-x}Ti_xO_4$ wherein x=$LiNi_{0.8}Co_{0.2}O_2$, $LiNi_{0.33}Mn_{0.33}Co_{0.33}O_2$, $LiNi_{0.5}Mn_{0.5}O_2$, $LiCoMnO_4$, $LiCo_{0.5}Mn_{1.5}O_4$, $LiCr_{0.5}Mn_{1.5}O_4$ and $LiNi_{0.5}Mn_{1.5}O_4$.

Preferably, the composite material comprises at least one conditioner with regard to electric conductivity, preferably
at least one conductive polymer, preferably a polymer selected from the group consisting of cis-/trans-polyacetylene, polyparaphenylene, polythiophene, polypyrrole, poly(p-phenylene vinylene) and polyaniline
and/or
at least one organic semiconductiong compound, preferably at least one linear condensed organic semiconductor, for example, chinacridon, antracene or derivatives thereof, and/or at least one two-dimensional condensed organic semiconductor, for example, perylene and derivatives thereof or 3,4,9,10-perylenetetracarboxylic dianhydride
and/or
at least one metal or metal alloy, preferably from the group consisting of aluminum, nickel and gold
and/or
at least one carbon material, preferably selected from the group consisting of carbon black, graphite, carbon nanowires, carbon nanotubes and graphene.

Particularly preferably, the inorganic particulate material comprises at least one of the metal oxides, preferably $LiMnPO_4$, $LiCoPO_4$, $LiFePO_4$, $LiNiPO_4$, $LiMn_2O_4$, $LiAl_2O_4$, $LiCo_2O_4$ and/or $LiNi_2O_4$, and least one of the conditioners with regard to electric conductivity, wherein the at least one conditioner is deposited on the surface of the particulate material.

The composite material may, in addition to the at least one conditioner with regard to electric conductivity or as an alternative thereto, comprise a conditioner with regard to ion conductivity, preferably with regard to the conductivity of lithium ions, in particular a suitable ceramic ion conductor.

It is preferred that the composite material comprises a binder polymer, preferably a binder polymer that is soluble in an organic solvent like NMP (N-Methyl-2-pyrrolidone) or NEP (N-Ethyl-2-pyrrolidone), for example, PVDF (Polyvinylidene fluoride) or PVDF-HFP (Poly(vinylidene fluoride-hexafluoropropylene)).

Preferably the composite material comprises:
the electrochemically active organic material in a portion of 1 wt. % to 80 wt. % in relation to the total mass of the composite material,
the electrochemically active inorganic material in a portion of 1 wt. % to 80 wt. % in relation to the total mass of the composite material,
the at least one conditioner with regard to electric conductivity in a portion of 0 wt. % to 20 wt. %, preferably 1 wt. % to 20 wt. %, in relation to the total mass of the composite material,
the at least one conditioner with regard to ion conductivity in a portion of 0 wt. % to 20 wt. %, preferably 1 wt. % to 20 wt. %, in relation to the total mass of the composite material, and/or
the at least one binder polymer in a portion of 1 wt. % to 20 wt. % in relation to the total mass of the composite material.

Preferably, these percentages sum up to 100% by weight.

Preferably the composite material is a particulate material with particles or consisting of particles having a size of 0.01 μm to 100 μm, preferably 0.1 μm to 20 μm.

The electrochemically active organic material is preferably produced by polymerization in an organic solvent. The composite material is obtained by mixing the organic material with the inorganic particulate material. Thus, preferably, the composite material capable of storing electric energy, comprises a mixture of the electrochemically active inorganic particulate material and the electrochemically active organic material.

Particularly preferably, the composite material is produced by producing the electrochemically active organic material by polymerization in an organic solvent in a first step and by adding the inorganic particulate material and, if appropriate, the at least one conditioner with regard to electric conductivity and/or the at least one conditioner with regard to ionic conductivity and/or the at least one binder polymer in a second step into the organic solvent containing the polymerization product (the polymer), thereby forming a slurry. Preferably, the inorganic particulate material is added into the organic solvent without any intermediate step of working up the mixture of the solvent and the polymer contained therein.

At the end of the first step of the synthesis in NMP, the produced polymer is dissolved in the organic solvent and can be further processed directly to the composite material.

As organic solvent preferably a solvent like NMP, NEP, DMF (Dimethyl formamide), THF (Tetrahydrofuran), DMA (Dimethyl acetamide) and DMSO (Dimethyl sulfoxide) is chosen.

It is preferred that the organic solvent is removed in a third step to produce the composite material. Preferably, the electrochemically active organic material deposits on the surface of the inorganic particulate material and, if appropriate, on the surface of one of the conditioners with regard to electric conductivity if the conditioner is present in particulate form and/or of the at least one conditioner with regard to ionic conductivity, also, if the conditioner is present in particulate form during this step. As a result, the electrochemically active organic material may cover the particle surfaces of the inorganic particulate material and, if appropriate, the surfaces of the conditioner particles, completely.

In an optional fourth step, the obtained material is ground to particles with a defined size, in particular a size of 0.01 μm to 100 μm, preferably 0.1 μm to 20 μm.

Any electrode comprising the composite material may be used.

Our electrodes are produced by processing the composite material
a. either with a binder soluble in an organic solvent, or
b. with a binder soluble in water.

Usually the composite material and the organic solvent or the water form a solution or, more often, a dispersion. Preferably, at least one of the above described conditioners with regard to electric conductivity is added into the solution or dispersion, in particular at least one carbon material selected from the group consisting of carbon black, graphite, carbon nanowires, carbon nanotubes and graphene.

The solution or the dispersion may be coated onto a metallic current collector, for example, by a doctor blade. However, the solution or the dispersion may also be processed by an ink jet printer.

Preferably, the binder is selected from the group consisting of cellulose based binders, polyacrylate based binder, SBR, latex and fluoroacrylate based binders.

The electrode binder is preferably contained in the electrode in an amount of 0.1% by weight to 20% by weight, more preferably 0.1% by weight to 10% by weight, in particular 1% by weight to 10% by weight. Even more preferred is 1% by weight to 7.5% by weight.

If the electrode contains the at least one conditioner with regard to electric conductivity, the at least one conditioner is preferably contained in the electrode in an amount of 1% by weight to 80% by weight, more preferably 1% by weight to 10% by weight.

The composite material is preferably contained in the electrode in an amount of 20% by weight to 99% by weight, more preferably 90% by weight to 99% by weight.

The electrode may comprise a current collector, in particular a current collector made of aluminium or copper.

Each electrochemical cell with a positive and a negative electrode comprising the claimed composite material or the claimed electrode or the electrochemically active organic material may be used. Preferred types of the cell are lithium ion batteries, battery capacitors and hybrid battery capacitors.

Preferably, the electrochemical cell contains the composite material or the electrode or the electrochemically active organic material as part of the positive electrode or as positive electrode. Preferably, the negative electrode of the electrochemical cell comprises at least one material selected from the group consisting of metallic lithium, graphite, hard carbon, graphene, activated carbon, silicon, tin, antimony, bismuth, lithium-iron-silicide and $Li_4Ti_5O_{12}$.

Preferably, the electrochemical cell comprises a separator and a mixture of a solvent and a conducting salt contained therein.

As organic electrolyte the electrochemical element and the electrode may contain in particular any organic electrolyte known to be suitable as electrolyte for Lithium-ion batteries or double layer capacitors. Preferably, the electrolyte is a mixture of a solvent and a conducting salt contained therein. The solvent preferably comprises ethylene carbonate (EC) and/or at least one further carbonate selected from the group consisting of diethyl carbonate (DEC), dimethyl carbonate (DMC), ethyl-methyl carbonate (EMC) and propylene carbonate (PC).

The conducting salt is preferably a lithium fluorophosphate, a lithium borate and/or a lithium alkylsulfonylimid.

Our Lithium-ion battery comprises the electrode or the composite material. It is preferred that the Lithium-ion battery is a secondary battery. Preferably, the Lithium-ion battery contains the composite material or the electrode as part of the positive electrode or as positive electrode.

The negative electrode of the Lithium-ion battery may contain metallic lithium or particles based on carbon like graphitic carbon or non graphitic carbon materials capable of intercalation of lithium. Furthermore, the negative electrode may also contain metallic and semimetallic materials that can be alloyed with lithium. Thus, for example, the elements tin, antimony and silicon are able to form intermetallic phases with lithium.

Our battery capacitor comprises the electrode or the composite material or the electrochemically active organic material in an electrode and further a counter electrode having a double-layer capacitance. Preferably, the counter electrode comprises or consists of activated carbon.

Electrodes having a double-layer capacitance are typically known as electrodes of capacitors. Double-layer capacitance means that electrostatic storage is achieved by separation of charge in a Helmholtz double layer at the interface between the surface of a conductive electrode and an electrolyte. Here, an electrode having a double-layer capacitance (the counter electrode) is combined with an electrode that stores electric energy by an electrochemical storage with electron charge-transfer, achieved by redox reactions, intercalation or electrosorption (the electrode comprising the composite material or the electrochemically active organic material).

Preferably, the battery capacitor contains the composite material or the electrode or the electrochemically active organic material as part of the positive electrode or as positive electrode. The counter electrode is preferably the negative electrode.

Preferably, our battery capacitor comprises as negative electrode a carbon electrode, in particular an electrode comprising or being composed of activated carbon.

Preferably, the negative electrode of the battery capacitor contains the carbon or activated carbon in an amount of 10% by weight to 100% by weight, more preferably 25% by weight to 99% by weight, in particular 50% by weight to 99% by weight. Even more preferred is an amount of 75% by weight to 99% by weight.

The composite material or the electrochemically active organic material is preferably contained in the positive electrode of the battery capacitor in an amount of 5% by weight to 75% by weight, more preferably 10% by weight to 50% by weight, in particular 15% by weight to 40% by weight.

Our hybrid battery capacitor comprises an electrode comprising the composite material or the electrochemically active organic material as a first component and activated carbon as a second component. Such an electrode has a double-layer capacitance and a pseudocapacitance at the same time. Pseudocapacitance is the electrochemical storage of electricity in an electrochemical capacitor. This faradaic charge transfer originates by a very fast sequence of reversible faradaic redox, electrosorption or intercalation processes.

The hybrid battery capacitor comprises as a counter electrode either an electrode having a double-layer capacitance or another electrode having a double-layer capacitance and a pseudocapacitance at the same time. For example, the counter electrode may consist of activated carbon or of a mixture of at least one of graphite, hard carbon, graphene, silicon, tin, antimony, bismuth, lithium-iron-silicide and $Li_4Ti_5O_{12}$ and activated carbon.

Preferably, the hybrid battery capacitor contains the first and the second component as part of the positive electrode or as positive electrode. The counter electrode is preferably the negative electrode.

If the negative electrode of the hybrid battery capacitor is an electrode having a double-layer capacitance it is preferred that it contains the carbon or activated carbon in an amount in the range of 10% by weight to 100% by weight, more preferably 25% by weight to 99% by weight, in particular 50% by weight to 99% by weight. Even more preferred is an amount of 75% by weight to 99% by weight.

If the negative electrode of the hybrid battery capacitor is an electrode having a double-layer capacitance and a pseudocapacitance at the same time it is preferred that it contains the carbon or activated carbon in an amount of 10% by weight to 99% by weight, more preferably 15% by weight to 95% by weight, in particular 50% by weight to 85% by weight.

It is preferred that the positive electrode of the hybrid battery capacitor comprises 1% by weight to 99% by weight of the activated carbon, more preferably 15% by weight to 95% by weight, more preferably 50% by weight to 85% by weight, in particular 60% by weight to 80% by weight.

The composite material or the described electrochemically active organic material is preferably contained in the positive electrode of the hybrid battery capacitor in an amount of 5% by weight to 75% by weight, more preferably 10% by weight to 50% by weight, in particular 15% by weight to 40% by weight.

Preferably, the activated carbon used in in the electrodes has a BET-surface of at least 900 $m^2/g$ (determined according to German standard DIN ISO 9277) and/or a capacity of at least 60 F/g (determined according to German standard DIN IEC 62391).

The positive and the negative electrode of the battery capacitor and the hybrid battery capacitor may contain one of the above mentioned electrode binders and/or one of the conditioners with regard to electric conductivity.

The above mentioned percentages each relate to the total weight of the electrodes in a dry condition, that is before the electrodes are impregnated with electrolyte, without taking into account the weight of a current collector, if any. Further, the above mentioned percentages preferably sum up to 100% by weight.

Our materials, electrodes, cells and methods are further illustrated by the following figures and examples, however, without being restricted thereto.

EXAMPLES

Example 1

A copolymer of N,N'-bis(4-aminophenyl)-N,N'-diphenyl-1,4-phenylenediamine and isophthaloyl dichloride (compound 1) was synthesized as a first example of a polymeric electrode material according to the following scheme:

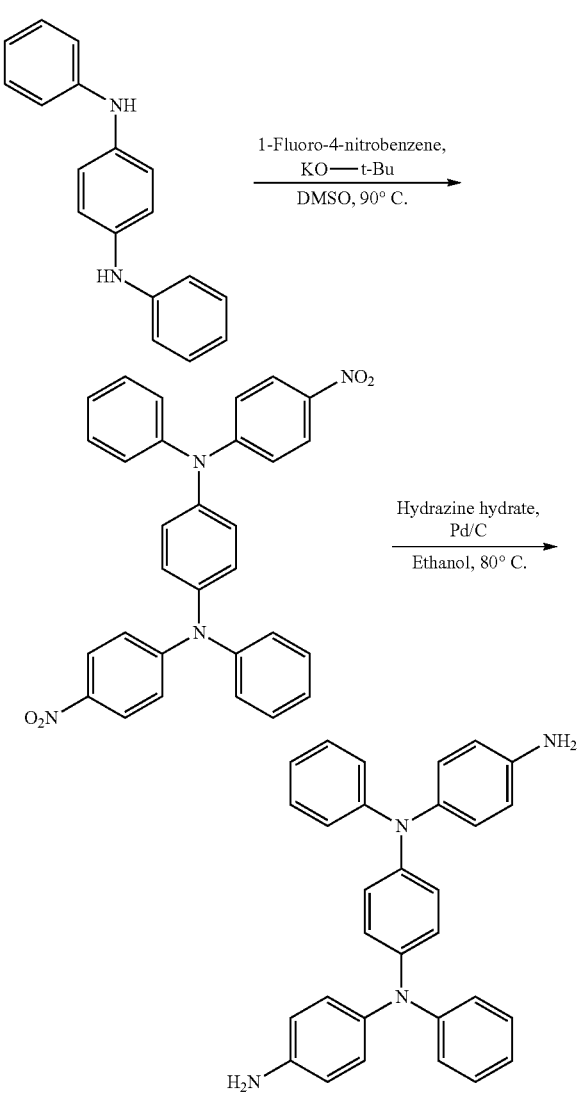

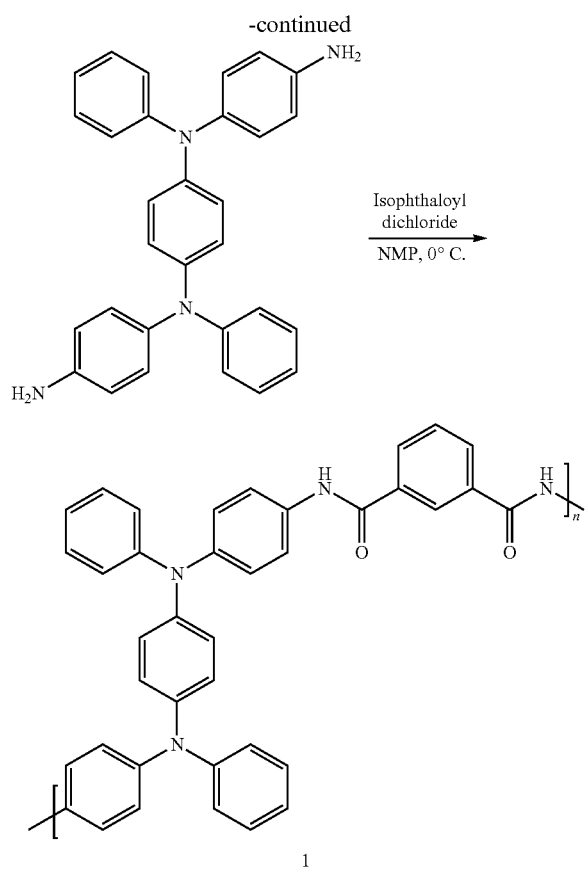

Step A: N,N'-bis(4-nitrophenyl)-N,N'-diphenyl-1,4-phenylenediamine

Prepared as described in Davis, M. C.; Chafin, A. C.; Sathrum, A. J. Synthetic Communications 2005, 35, 2085-2090.

Purified N,N'-diphenyl-p-phenylenediamine (2.03 g, 7.8 mmol) was dissolved in anhydrous DMSO (13.4 mL), potassium tert-butoxide (2.20 g, 2.5 eq.) and 1-fluoro-4-nitrobenzene (2.15 mL, 2.6 eq) were added and the reaction mixture was stirred for 17 h at 90° C. The mixture was cooled to room temperature and added dropwise to 200 mL of a stirred solution of saturated aqueous NaCl. The resulting orange-brown precipitate was filtered, washed with 100 mL of water and dissolved in 100 mL of dichloromethane. The organic phase was washed 2 times with approximately 50 mL of water, dried over $Na_2SO_4$ and concentrated under reduced pressure. The crude product was dispersed in 100 mL of refluxing acetonitrile for 1 h, cooled, filtered and dried under vacuum to obtain the title compound as orange-red solid (3.57 g, 91%).

$^1$H NMR (300.36 MHz, DMSO-d6, δ in ppm): 8.14-8.04 (m, 4H), 7.54-7.43 (m, 4H), 7.35-7.25 (m, 10H), 6.92-6.83 (m, 4H); $^{13}$C NMR (APT, 75.53 MHz, DMSO-d6, δ in ppm): 153.18, 144.82, 142.38, 139.28, 130.37, 127.93, 127.00, 126.44, 125.65, 117.34; EI-MS: M+, m/z found: 502.1635 Da, calculated for $C_{30}H_{22}N_4O_4$: 502.1641 Da; IR: 1581, 1486, 1310, 1298, 1279, 1255, 1185, 1107, 997, 832, 749, 710, 691, 649, 553, 519, 502, 414 cm$^{-1}$ Step B: N,N'-bis(4-aminophenyl)-N,N'-diphenyl-1,4-phenylenediamine Prepared as described in Liou, G.-S.; Hsiao, S.-H.; Ishida, M.; Kakimoto, M.; Imai, Y. Journal of Polymer Science Part A: Polymer Chemistry 2002, 40, 2810-2818.

N,N'-bis(4-nitrophenyl)-N,N'-diphenyl-1,4-phenylenediamine (1.52 g, 3 mmol) and Pd/C (80 mg, 5.3 wt-%) were dispersed in ethanol (10 mL), hydrazine hydrate (1.5 mL, 10.2 eq.) was added dropwise and the reaction mixture was stirred at 80° C. for 17 h. After cooling, 20 mL of DMF were added, the mixture was filtered to remove the catalyst and washed thoroughly with approximately 30 mL of DMF. The filtrate was concentrated under reduced pressure, added dropwise to 100 mL of a stirred solution of saturated aqueous NaCl and the resulting precipitate was filtered. The crude product was slurried in 50 mL of boiling toluene for 3 h, cooled and filtered. This purifying procedure was repeated and the resulting solid was dried under vacuum to obtain the title compound as beige solid (0.62 g, 46%).

$^1$H NMR (300.36 MHz, DMSO-d6, δ in ppm): 7.20-7.10 (m, 4H), 6.90-7.73 (m, 14H), 6.60-6.52 (m, 4H), 5.05 (s, 4H, —NH2); $^{13}$C NMR (APT, 75.53 MHz, DMSO-d6, δ in ppm): 148.45, 146.11, 142.06, 135.27, 128.95, 127.91, 123.80, 119.95, 119.78, 115.0; EI-MS: M+, m/z found: 442.2146 Da, calculated for $C_{30}H_{26}N_4$: 442.2158 Da; IR: 3469, 3377, 3032, 1620, 1590, 1501, 1482, 1306, 1263, 1175, 1121, 1079, 1026, 834, 754, 723, 697, 665, 586, 534, 518, 507, 442, 409

Step C: Polymerization

N,N'-bis(4-aminophenyl)-N,N'-diphenyl-1,4-phenylenediamine (306 mg, 0.69 mmol) was dissolved in anhydrous NMP (1.85 mL), cooled to 0° C. and isophthaloyl dichloride (140 mg, 1 eq., recrystallized from n-hexane prior to use) was added in portions. The reaction mixture was gradually warmed up to room temperature with stirring. After 3 h the now highly viscous solution was added dropwise to 20 mL of stirred methanol. The precipitate was stirred in 20 mL of boiling methanol for 3 hours, filtered and dried under vacuum to obtain compound 1 as green solid (389 mg, 98%).

$^1$H NMR (300.36 MHz, DMSO-d6, δ in ppm): 10.35 (s, 2H, —NH—CO—), 8.44 (s, 1H), 8.12-7.98 (m, 2H), 7.75-7.55 (m, 5H), 7.20 (br, 4H), 7.05-6.81 (m, 14H); $^{13}$C NMR (APT, 75.53 MHz, DMSO-d6, δ in ppm): 164.78, 147.47, 142.97, 142.24, 135.19, 134.47, 129.40, 124.84, 124.49, 122.52, 121.72; IR: 3273, 3035, 1665, 1593, 1498, 1308, 1263, 1111, 827, 753, 718, 695, 522, 470, 411 cm$^{-1}$ Example 2

A Copolymer of N,N-Bis(4-aminophenyl)-N',N'-di(4-methoxyphenyl)-1,4-phenylene-diamine and terephthalic acid (compound 3) was synthesized as a second example of a polymeric electrode material according to the following scheme:

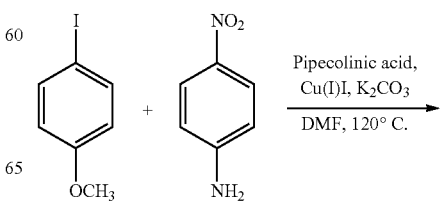

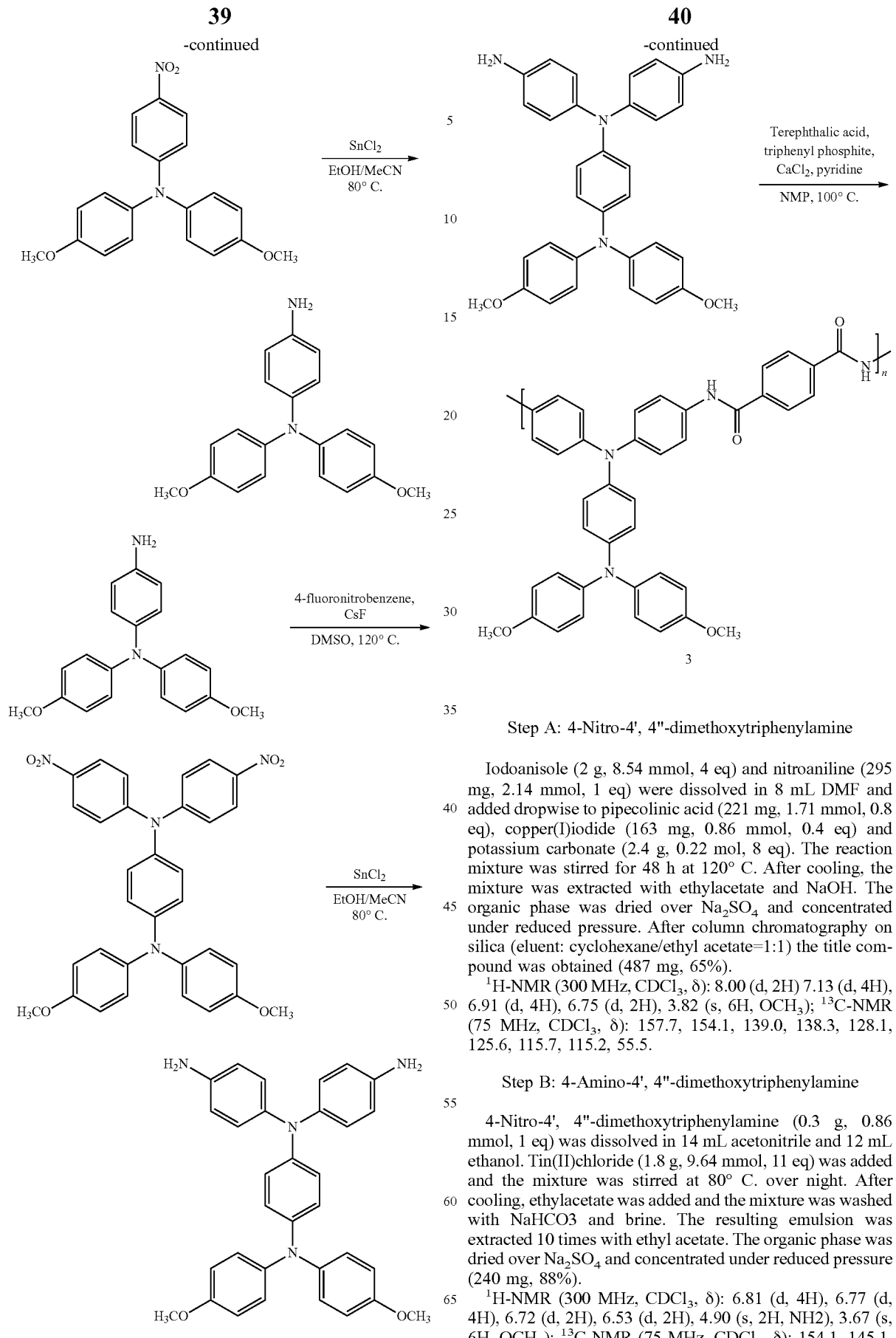

Step A: 4-Nitro-4', 4''-dimethoxytriphenylamine

Iodoanisole (2 g, 8.54 mmol, 4 eq) and nitroaniline (295 mg, 2.14 mmol, 1 eq) were dissolved in 8 mL DMF and added dropwise to pipecolinic acid (221 mg, 1.71 mmol, 0.8 eq), copper(I)iodide (163 mg, 0.86 mmol, 0.4 eq) and potassium carbonate (2.4 g, 0.22 mol, 8 eq). The reaction mixture was stirred for 48 h at 120° C. After cooling, the mixture was extracted with ethylacetate and NaOH. The organic phase was dried over $Na_2SO_4$ and concentrated under reduced pressure. After column chromatography on silica (eluent: cyclohexane/ethyl acetate=1:1) the title compound was obtained (487 mg, 65%).

$^1$H-NMR (300 MHz, $CDCl_3$, δ): 8.00 (d, 2H) 7.13 (d, 4H), 6.91 (d, 4H), 6.75 (d, 2H), 3.82 (s, 6H, $OCH_3$); $^{13}$C-NMR (75 MHz, $CDCl_3$, δ): 157.7, 154.1, 139.0, 138.3, 128.1, 125.6, 115.7, 115.2, 55.5.

Step B: 4-Amino-4', 4''-dimethoxytriphenylamine

4-Nitro-4', 4''-dimethoxytriphenylamine (0.3 g, 0.86 mmol, 1 eq) was dissolved in 14 mL acetonitrile and 12 mL ethanol. Tin(II)chloride (1.8 g, 9.64 mmol, 11 eq) was added and the mixture was stirred at 80° C. over night. After cooling, ethylacetate was added and the mixture was washed with NaHCO3 and brine. The resulting emulsion was extracted 10 times with ethyl acetate. The organic phase was dried over $Na_2SO_4$ and concentrated under reduced pressure (240 mg, 88%).

$^1$H-NMR (300 MHz, $CDCl_3$, δ): 6.81 (d, 4H), 6.77 (d, 4H), 6.72 (d, 2H), 6.53 (d, 2H), 4.90 (s, 2H, NH2), 3.67 (s, 6H, $OCH_3$); $^{13}$C-NMR (75 MHz, $CDCl_3$, δ): 154.1, 145.1, 142.2, 137.1, 126.6, 123.4, 115.1, 114.7, 55.3; IR: 3455, 3371 cm$^{-1}$ (N—H stretch), 2966, 2920, 2845 cm$^{-1}$ (OCH$_3$, C—H stretch).

Step C: N,N-Bis(4-nitrophenyl)-N',N'-di(4-methoxyphenyl)-1,4-phenylenediamine Prepared as described in Liou, G.; Chang, C. Macromolecules 2008, 41, 1667-1674.

Cesium fluoride (247 mg, 1.62 mmol, 2.2 eq) in 4 mL DMSO was stirred at room temperature. 4-amino-4', 4"-dimethoxytriphenylamine (240 mg, 0.75 mmol, 1.1 eq) and 4-fluoronitrobenzene (165 µL=220 mg, 1.56 mmol, 2 eq) were added in sequence and the reaction mixture was stirred at 120° C. After 24 h the mixture was slowly poured into 50 mL of stirred H2O and the precipitation was filtered. The crude product was recrystallized from DMF/MeOH (315 mg, 75%).

$^1$H-NMR (300 MHz, DMSO-d6, δ): 8.16 (d, 4H), 7.19 (d, 4H), 7.11 (d, 4H), 7.04 (d, 2H), 6.93 (d, 4H), 6.77 (d, 2H), 3.73 (s, 6H, OCH$_3$); $^{13}$C-NMR (75 MHz, DMSO-d6, δ): 156.5, 151.9, 147.8, 141.8, 139.6, 135.5, 128.8, 127.7, 125.8, 122.0, 119.4, 115.3, 55.5; IR: 2934, 2834 (OCH$_3$, C—H stretch), 1581, 1311 (NO$_2$ stretch)

Step D: N,N-Bis(4-aminophenyl)-N',N'-di(4-methoxyphenyl)-1,4-phenylenediamine N,N-Bis(4-nitrophenyl)-N',N'-di(4-methoxyphenyl)-1,4-phenylenediamine (1.6 g, 2.84 mmol, 1 eq) was dissolved in 45 mL acetonitrile and 50 mL ethanol and tin(II)dichloride (14.1 g, 62.6 mmol, 22 eq) was added. The reaction mixture was stirred at 80° C. over night. After cooling ethyl acetate was added and the mixture was washed with brine and NaHCO$_3$. The organic phase was dried over Na$_2$SO$_4$ and concentrated under reduced pressure. After column chromatography on silica the title compound was obtained (1.4 g, 70%).

$^1$H-NMR (300 MHz, DMSO-d6, δ): 6.85 (d, 4H), 6.80 (d, 4H), 6.77 (d, 4H), 6.70 (d, 2H), 6.56 (d, 2H), 6.50 (d, 4H), 4.50 (bs, 4H, NH$_2$), 3.73 (s, 6H, OCH$_3$); $^{13}$C-NMR (75 MHz, DMSO-d6, δ): 154.6, 145.3, 144.9, 141.8, 139.6, 136.6, 127.7, 124.6, 124.4, 118.9, 115.0, 114.9, 55.4; IR: 3434, 3360 cm$^{-1}$ (N—H stretch), 2947, 2832 cm$^{-1}$ (OCH$_3$, C—H stretch)

Step E: Polymerization

Prepared as described in Liou, G.; Chang, C. Macromolecules 2008, 41, 1667-1674.

N,N-Bis(4-aminophenyl)-N',N'-di(4-methoxyphenyl)-1,4-phenylenediamine (0.1 g, 0.2 mmol, 1 eq), terephthalic acid (33 mg, 0.2 mmol, 1 eq), calcium chloride (24 mg, 0.21 mmol, 1 eq) were dissolved in 0.19 mL NMP and evacuated while stirring. Pyridine (0.1 mL, 1.24 mmol, 6 eq) was added and the mixture was heated to 100° C. At this temperature triphenyl phosphite (0.17 g, 0.77 mmol, 3.6 eq) was added, the reaction mixture was stirred for four hours and then added dropwise to cold methanol (129 mg, 97%).

$^1$H-NMR (300 MHz, DMSO-d6, δ): 10.40 (s, 2H, —NH—CO—), 8.11 (s, 4H), 7.70 (d, 4H), 7.00 (d, 8H), 6.88 (d, 6H), 6.77 (d, 2H), 3.72 (s, 6H, OCH$_3$); $^{13}$C-NMR (75 MHz, DMSO-d6, δ): 164.7, 155.5, 144.0, 143.7, 140.8, 137.6, 133.8, 127.8, 126.1, 125.3, 123.3, 122.0, 115.1, 55.4; IR: 3312 cm$^{-1}$ (N—H stretch), 3037 cm$^{-1}$ (aromatic C—H stretch), 2932, 2833 cm$^{-1}$ (OCH$_3$, C—H stretch), 1654 cm$^{-1}$ (amide carbonyl), 1239 cm$^{-1}$ (asymmetric stretch C—O—C), 1034 cm$^{-1}$ (symmetric stretch C—O—C).

Electrode Example 1—Lithium-Ion Battery

A slurry containing 20 wt-% compound 1, 60 wt-% LiMn$_2$O$_4$, 15 w % Super-P and 5 wt-% PVdF (polyvinylidene difluoride) binder in NMP was cast on carbon-coated aluminum foil (current collector) by doctor blade (the percentages each relate to the total weight of the solids in the slurry, without taking into account the weight of NMP).

Electrodes were die cut, dried and assembled in Swagelok cells, containing Lithium as anode and reference electrode, a polyolefin membrane as a separator, ethylene carbonate/diethyl carbonate (3/7, v/v) containing 1M LiPF$_6$ as electrolyte. The cell had a good cyclability as shown in FIG. 1.

Electrode Example 2—Lithium-Ion Battery

A slurry containing 20 wt-% compound 1, 60 wt-% LiFePO$_4$, 15 w % Super-P and 5 wt-% PVdF (polyvinylidene difluoride) binder in NMP was cast on carbon-coated aluminum foil (current collector) by doctor blade (the percentages each relate to the total weight of the solids in the slurry, without taking into account the weight of NMP).

Figure 2:
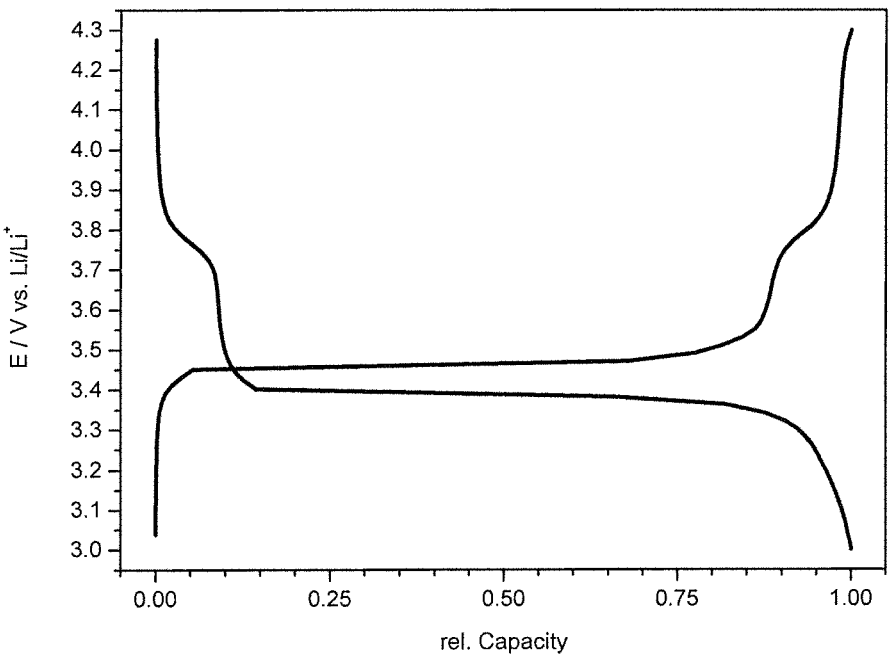

Electrodes were die cut, dried and assembled in Swagelok cells, containing Lithium as anode and reference electrode, a polyolefine membrane as a separator, ethylene carbonate/diethyl carbonate (3/7, v/v) containing 1M LiPF$_6$ as electrolyte. The cell had a good cyclability as shown in FIG. 2.

Electrode Example 3—Lithium-Ion Battery

A slurry containing 20 wt-% compound 1, 60 wt-% LiCo$_{1/3}$Mn$_{1/3}$Ni$_{1/3}$, 15 w % Super-P and 5 wt-% PVdF (polyvinylidene difluoride) binder in NMP was cast on carbon-coated aluminum foil (current collector) by doctor blade (the percentages each relate to the total weight of the solids in the slurry, without taking into account the weight of NMP).

Figure 3:
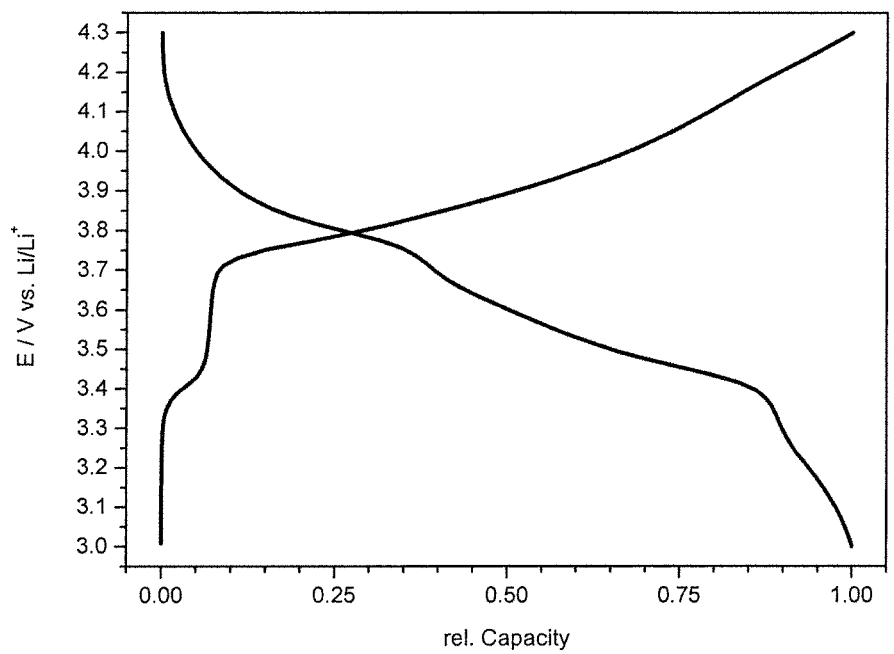

Electrodes were die cut, dried and assembled in Swagelok cells, containing Lithium as anode and reference electrode, a polyolefine membrane as a separator, ethylene carbonate/diethyl carbonate (3/7, v/v) containing 1M LiPF$_6$ as electrolyte. The cell had a good cyclability as shown in FIG. 3.

Electrode Example 4—Hybrid Battery Capacitor

A slurry containing 25 wt-% compound 1, 65 wt-% activated carbon, 5 w % Super-P and 5 wt-% PVdF (polyvinylidene difluoride) binder in NMP was cast on carbon-coated aluminum foil (current collector) by doctor blade (the percentages each relate to the total weight of the solids in the slurry, without taking into account the weight of NMP).

Figure 4:
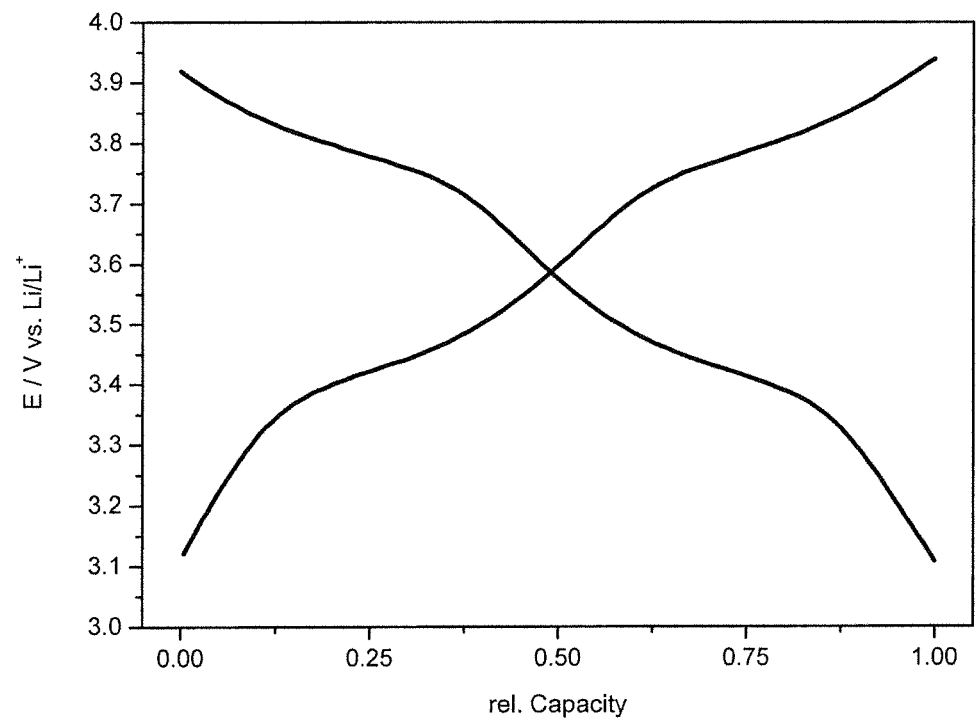

Electrodes were die cut, dried and assembled in Swagelok cells, containing Lithium as anode and reference electrode, a polyolefine membrane as a separator, ethylene carbonate/diethyl carbonate (3/7, v/v) containing 1M LiPF$_6$ as electrolyte. The cell had a good cyclability as shown in FIG. 4.

Electrode Example 5—Lithium-Ion Battery

A slurry containing 25 wt-% component 1, 65 wt-% graphite, 5 w % Super-P and 5 wt-% PVdF (polyvinylidene difluoride) binder in NMP was cast on carbon-coated aluminum foil (current collector) by doctor blade (the percentages each relate to the total weight of the solids in the slurry, without taking into account the weight of NMP).

Figure 5:
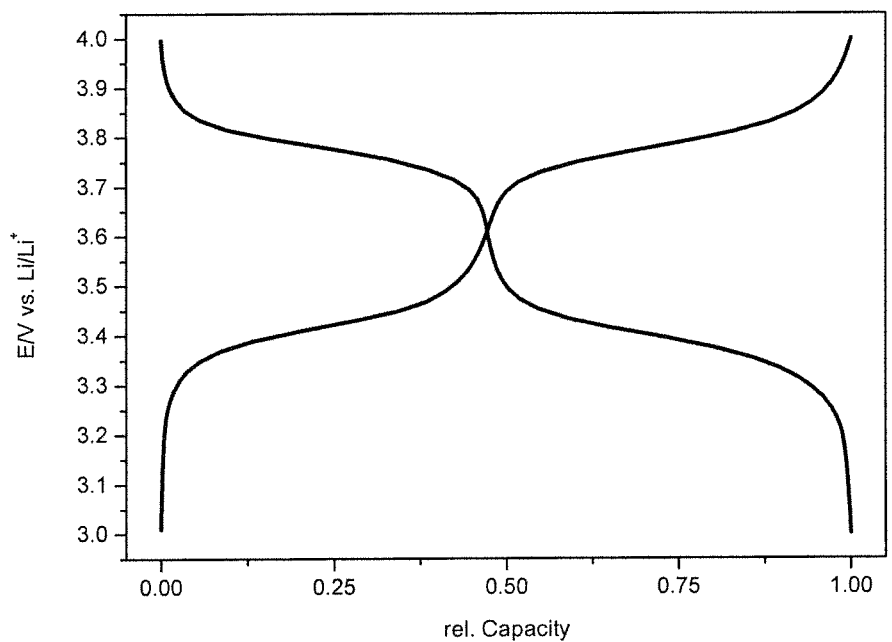

Electrodes were die cut, dried and assembled in Swagelok cells, containing Lithium as anode and reference electrode, a polyolefine membrane as a separator, ethylene carbonate/diethyl carbonate (3/7, v/v) containing 1M $LiPF_6$ as electrolyte. The cell had a good cyclability as shown in FIG. 5.

Electrode Example 6—Hybrid Battery Capacitor

A slurry containing 45 wt-% component 1, 40 wt-% activated carbon, 10 w % Super-P and 5 wt-% PVdF (polyvinylidene difluoride) binder in NMP was dried at 100° C. to remove the NMP (the percentages each relate to the total weight of the solids in the slurry, without taking into account the weight of NMP). The obtained composite 1 was ground to particles with a defined size by ball milling. A slurry containing 90 wt-% composite 1, 5 wt-% Na-CMC (binder), 5 wt-% fluoroacrylate based binder in $H_2O$ was cast on carbon-coated aluminum foil (current collector) by doctor blade (the percentages each relate to the total weight of the solids in the slurry, without taking into account the weight of $H_2O$).

Figure 6:
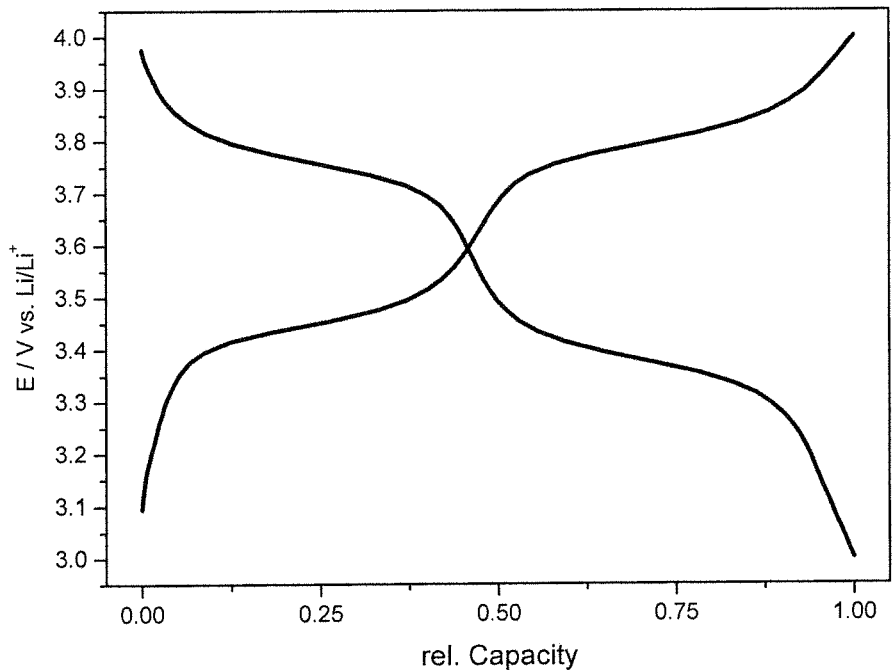

Electrodes were die cut, dried and assembled in Swagelok cells, containing Lithium as anode and reference electrode, a polyolefine membrane as a separator, ethylene carbonate/diethyl carbonate (3/7, v/v) containing 1M $LiPF_6$ as electrolyte. The cell had a good cyclability as shown in FIG. 6.

The invention claimed is:

1. A composite material capable of storing electric energy comprising:
    an electrochemically active inorganic particulate material, and
    an electrochemically active organic material,
wherein the electrochemically active organic material contains subunits according to formulae (I) and/or (II),

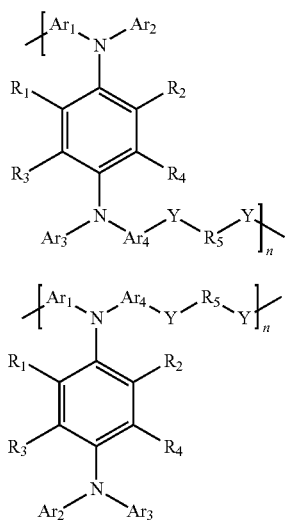

wherein, in these formulae (I) and (II):
  n is an integer ≥2,
  Y represents —NH—CO— or —CO—NH— as an amide group, —O—CO— or —CO—O— as an ester group or —NH—CO—O— or —O—CO—NH— as a urethane group,
  $R_1$, $R_2$, $R_3$ and $R_4$ each independently represent H, alkyl, alkoxy-, -halogen or —CN,
  $Ar_1$ and $Ar_4$ independently represent a bridging aryl group,
  $Ar_2$ and $Ar_3$ independently represent a non-bridging aryl group, and
  $R_5$ is a bridging alkyl, alkene or aryl group,
wherein $Ar_1$ and $Ar_4$ in formulae (I) and (II) independently represent a bridging aryl group of formulae (III.a), (III.b) or (III.c)

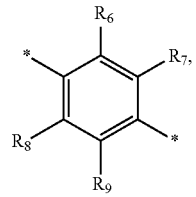

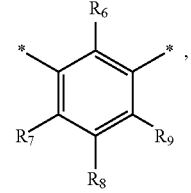

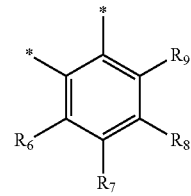

wherein in these formulae (III.a) to (III.c)
  * indicates a point of attachment,
  $R_6$, $R_7$, $R_8$ and $R_9$ each independently represent H, alkyl, alkoxy-, -halogen or —CN, and wherein $R_5$ represents one of the groups of formulae (VI.a) to (VI.q)

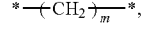

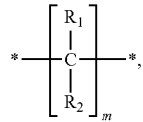

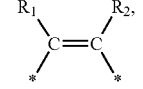

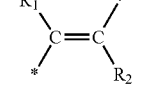

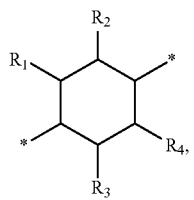 (VI.e)

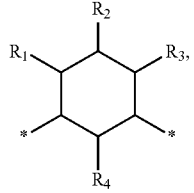 (VI.f)

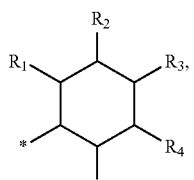 (VI.g)

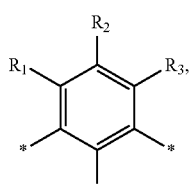 (VI.h)

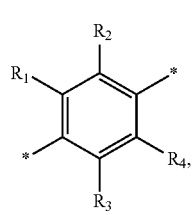 (VI.i)

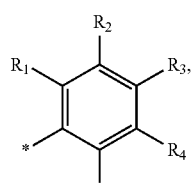 (VI.j)

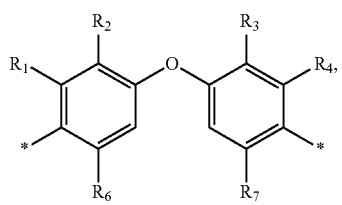 (VI.k)

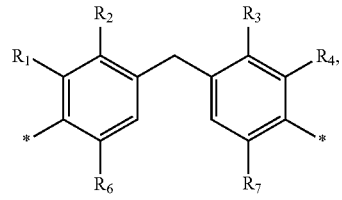 (VI.l)

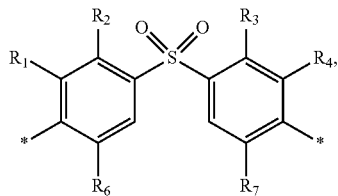 (VI.m)

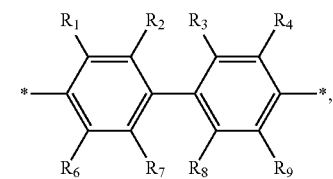 (VI.n)

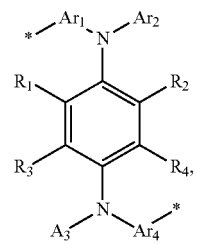 (VI.o)

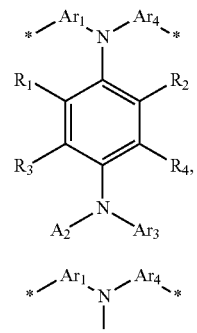 (VI.p)

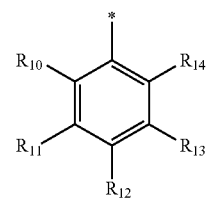 (VI.q)

wherein

* indicates a point of attachment, m=1 to 20, and $R_1$, $R_2$, $R_3$, $R_4$, $R_6$, $R_7$, $R_8$, $R_9$, $Ar_1$, $Ar_2$, $Ar_3$ and $Ar_4$ are defined as above.

2. The composite material according to claim 1, wherein $Ar_2$ and $Ar_3$ in formulae (I) and (II) independently represent a non-bridging aryl group of formula (IV)

(IV)

wherein $R_{10}$, $R_{11}$, $R_{12}$, $R_{13}$ and $R_{14}$ each independently represent H, alkyl, alkoxy-, halogen, CN or one of the groups of formulae (Va) and (Vb)

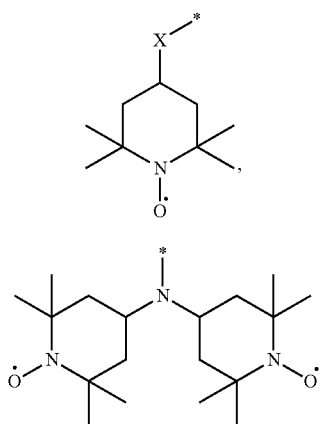

wherein
* indicates a point of attachment, and
X represents O or NH.

3. The composite material according to claim 2, wherein the organic material has a dynamic viscosity of 2.5 mPas to 50 mPas measured in NMP at 20° C. and at a concentration of 2 wt. %.

4. The composite material according to claim 1, wherein the organic material has a dynamic viscosity of 2.5 mPas to 50 mPas measured in NMP at 20° C. and at a concentration of 2 wt. %.

5. The composite material according to claim 1, wherein at least one of
the inorganic particulate material comprises particles of a carbon material, a metal oxide, or a mixture comprising or consisting of these particles,
the carbon material is selected from the group consisting of activated carbon, carbon nanotubes, graphene, graphene oxide and graphene derivatives, and
the metal oxide is selected from the group consisting of $LiMnPO_4$, $LiCoPO_4$, $LiFePO_4$, $LiNiPO_4$, $LiMn_2O_4$, $LiAl_2O_4$, $LiCo_2O_4$, $LiNi_2O_4$, $LiNiO_2$, $Li_4Ti_5O_{12}$, $LiCoO_2$, $LiNi_{0.5}Mn_{1.5-x}Ti_xO_4$ wherein x ist 0-1.5, $LiNi_{0.8}Co_{0.2}O_2$, $LiNi_{0.33}Mn_{0.33}Co_{0.33}O_2$, $LiNi_{0.5}Mn_{0.5}O_2$, $LiCoMnO_4$, $LiCo_{0.5}Mn_{1.5}O_4$, $LiCr_{0.5}Mn_{1.5}O_4$ and $LiNi_{0.5}Mn_{1.5}O_4$.

6. The composite material according to claim 1, wherein the composite material comprises:
at least one conditioner with regard to electric conductivity,
and/or
a conditioner with regard to ion conductivity
and/or
a binder polymer.

7. The composite material according to claim 6, wherein at least one of
the at least one conditioner with regard to electric conductivity is at least one conductive polymer or a polymer selected from the group consisting of cis-/trans-polyacetylene, polyparaphenylene, polythiophene, polypyrrole, poly(p-phenylene vinylene) and polyaniline,
the at least one conditioner with regard to electric conductivity is at least one organic semiconducting compound or at least one linear condensed organic semiconductor and/or at least one two-dimensional condensed organic semiconductor,
the at least one conditioner with regard to electric conductivity is at least one metal or metal alloy selected from the group consisting of aluminum, nickel and gold,
the at least one conditioner with regard to electric conductivity is at least one carbon material selected from the group consisting of carbon black, graphite, carbon nanowires, carbon nanotubes and graphene,
the conditioner with regard to ion conductivity is a conditioner with regard to the conductivity of lithium ions, and
the binder polymer is a binder polymer that is soluble in an organic solvent.

8. The composite material according to claim 7, wherein the inorganic particulate material comprises at least one of the metal oxides $LiMnPO_4$, $LiCoPO_4$, $LiFePO_4$, $LiNiPO_4$, $LiMn_2O_4$, $LiAl_2O_4$, $LiCo_2O_4$ and $LiNi_2O_4$, and that the conditioner with regard to electric conductivity is deposited on the surface of the particulate material.

9. The composite material according to claim 6, wherein the inorganic particulate material comprises at least one of the metal oxides, preferably $LiMnPO_4$, $LiCoPO_4$, $LiFePO_4$, $LiNiPO_4$, $LiMn_2O_4$, $LiAl_2O_4$, $LiCo_2O_4$ and/or $LiNi_2O_4$, and that the conditioner with regard to electric conductivity is deposited on the surface of the particulate material.

10. The composite material according to claim 6, wherein the composite material comprises:
1 wt. % to 80 wt. % of the electrochemically active organic particulate material in relation to the total mass of the composite material,
1 wt. % to 80 wt. % of the electrochemically active inorganic particulate material in relation to the total mass of the composite material,
1 wt. % to 20 wt. % of the at least one conditioner with regard to electric conductivity in relation to the total mass of the composite material,
1 wt. % to 20 wt. % of the at least one conditioner with regard to ion conductivity in relation to the total mass of the composite material, and
1 wt. % to 20 wt. % of the at least one binder polymer in relation to the total mass of the composite material.

11. A method of producing the composite material according to claim 6, comprising producing the electrochemically active organic material by polymerization in an organic solvent, the inorganic particulate material and, optionally, adding the at least one conditioner with regard to electric conductivity and/or the at least one conditioner with regard to ionic conductivity and/or the at least one binder polymer into the solvent containing the polymer, thereby forming a slurry.

12. The method according to claim 11, wherein the composite material is processed
either with a binder soluble in an organic solvent, or
with a binder soluble in water.

13. The method according to claim 12, wherein the binder is selected from the group consisting of cellulose based binders, polyacrylate based binder, SBR, latex and fluoroacrylate based binders.

14. An electrode comprising the composite material according to claim 1 and, optionally, a polymer binder soluble either in an organic solvent or water.

15. An electrochemical cell comprising a positive and a negative electrode, a composite material capable of storing electric energy comprising:
an electrochemically active inorganic particulate material, and
an electrochemically active organic material, wherein the electrochemically active organic material contains subunits according to formulae (I) and/or (II),

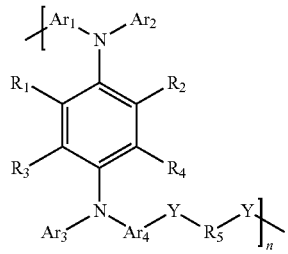
(I)

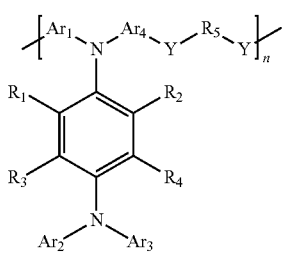
(II)

wherein, in these formulae (I) and (II):
n is an integer ≥2,
Y represents —NH—CO— or —CO—NH— as an amide group, —O—CO— or —CO—O— as an ester group or —NH—CO—O— or —O—CO—NH— as a urethane group,
$R_1$, $R_2$, $R_3$ and $R_4$ each independently represent H, alkyl, alkoxy-, -halogen or —CN,
$Ar_1$ and $Ar_4$ independently represent a bridging aryl group,
$Ar_2$ and $Ar_3$ independently represent a non-bridging aryl group, and
$R_5$ is a bridging alkyl, alkene or aryl group, wherein $Ar_1$ and $Ar_4$ in formulae (I) and (II) independently represent a bridging aryl group of formulae (III.a), (III.b) or (III.c)

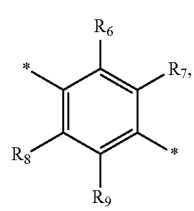
(III.a)

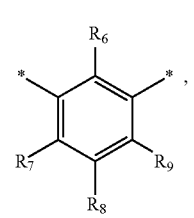
(III.b)

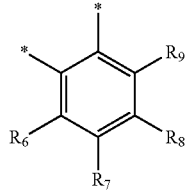
(III.c)

wherein in these formulae (III.a) to (III.c)
  * indicates a point of attachment,
  $R_6$, $R_7$, $R_8$ and $R_9$ each independently represent H, alkyl, alkoxy-, -halogen or —CN, and wherein $R_5$ represents one of the groups of formulae (VI.a) to (VI.q)

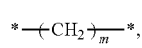
(VI.a)

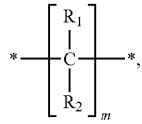
(VI.b)

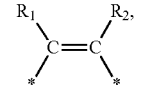
(VI.c)

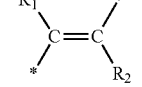
(VI.d)

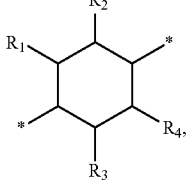
(VI.e)

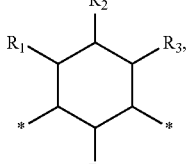
(VI.f)

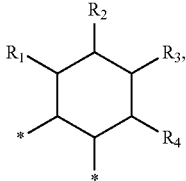
(VI.g)

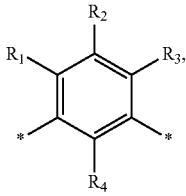
(VI.h)

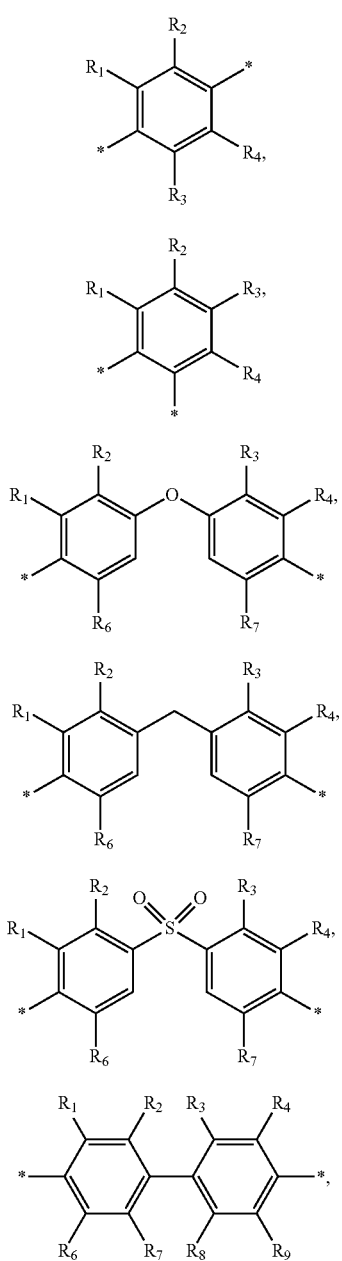

wherein
* indicates a point of attachment,
m=1 to 20, and
$R_1$, $R_2$, $R_3$, $R_4$, $R_6$, $R_7$, $R_8$, $R_9$, $Ar_1$, $Ar_2$, $Ar_3$ and $Ar_4$ are defined as above or the electrode according to claim 14, as part of the positive electrode or as the positive electrode.

16. The electrochemical cell according to claim 15, wherein the cell is a lithium ion battery, a double layer capacitor or a hybrid battery capacitor.

17. The electrochemical cell according to claim 16, further comprising a separator and a mixture of a solvent and a conducting salt contained therein.

18. The electrochemical cell according to claim 15, further comprising a separator and a mixture of a solvent and a conducting salt contained therein.

* * * * *